(12) United States Patent
Hirata et al.

(10) Patent No.: US 9,605,148 B2
(45) Date of Patent: Mar. 28, 2017

(54) FIBER-REINFORCED THERMOPLASTIC-RESIN MOLDING MATERIAL

(71) Applicant: Toray Industries, Inc., Tokyo (JP)

(72) Inventors: Shin Hirata, Nagoya (JP); Yuki Mitsutsuji, Nagoya (JP); Toru Nishimura, Nagoya (JP)

(73) Assignee: Toray Industries, Inc. (JP)

( * ) Notice: Subject to any disclaimer, the term of this patent is extended or adjusted under 35 U.S.C. 154(b) by 0 days.

(21) Appl. No.: 15/294,835

(22) Filed: Oct. 17, 2016

(65) Prior Publication Data

US 2017/0029580 A1 Feb. 2, 2017

Related U.S. Application Data

(62) Division of application No. 14/646,116, filed as application No. PCT/JP2013/083819 on Dec. 18, 2013.

(30) Foreign Application Priority Data

Dec. 21, 2012 (JP) ................................. 2012-279213
Dec. 21, 2012 (JP) ................................. 2012-279214
Dec. 21, 2012 (JP) ................................. 2012-279215

(51) Int. Cl.
C08L 69/00 (2006.01)
C08J 5/04 (2006.01)

(52) U.S. Cl.
CPC .............. *C08L 69/00* (2013.01); *C08J 5/047* (2013.01); *C08L 2205/03* (2013.01)

(58) Field of Classification Search
None
See application file for complete search history.

(56) References Cited

U.S. PATENT DOCUMENTS 6,306,474 B1 * 10/2001 Yoshioka ............... A63B 53/10
428/298.1
6,410,140 B1 * 6/2002 Land ....................... D01D 5/22
428/369

(Continued)

FOREIGN PATENT DOCUMENTS

JP 63-203306 A 8/1988
JP 2002-129027 A 5/2002

(Continued)

*Primary Examiner* — Robert S Loewe
(74) *Attorney, Agent, or Firm* — DLA Piper LLP (US)

(57) ABSTRACT

A fiber reinforced thermoplastic resin molding material includes 5 to 45 parts by weight of carbon fibers; 1 to 45 parts by weight of organic fibers; 20 to 93 parts by weight of a thermoplastic resin; and 1 to 20 parts by weight of a compound having a melt viscosity lower than the thermoplastic resin based on 100 parts by weight of the total amount of the carbon fibers, the organic fibers, the thermoplastic resin, and the compound having a melt viscosity lower than the thermoplastic resin, wherein the thermoplastic resin is contained at an outer side of a composite obtained by impregnating a fiber bundle including the carbon and organic fibers with the compound; the carbon and organic fibers are unevenly distributed in a cross section of the fiber bundle; and the length of the fiber bundle and the fiber reinforced thermoplastic resin molding material are substantially the same.

5 Claims, 2 Drawing Sheets

(56) References Cited

U.S. PATENT DOCUMENTS

| | | | | |
|---|---|---|---|---|
| 7,208,220 B2* | 4/2007 | Yamasaki | .............. | B29C 70/00 |
| | | | | 264/136 |
| 7,754,323 B2* | 7/2010 | Murai | .................. | B29C 43/003 |
| | | | | 264/331.11 |
| 7,914,882 B2* | 3/2011 | Erb | ..................... | C09K 3/1028 |
| | | | | 428/212 |
| 8,664,573 B2* | 3/2014 | Shah | ..................... | B64D 15/12 |
| | | | | 219/482 |
| 2002/0052440 A1* | 5/2002 | Tochioka | ................. | B29B 9/14 |
| | | | | 524/494 |
| 2004/0220325 A1 | 11/2004 | Kitano et al. | | |
| 2005/0143510 A1 | 6/2005 | Nakayama et al. | | |
| 2006/0068141 A1 | 3/2006 | Tsutsumi et al. | | |
| 2011/0260096 A1 | 10/2011 | Atarashi | | |
| 2012/0000691 A1* | 1/2012 | Shah | ..................... | B82Y 30/00 |
| | | | | 174/102 R |
| 2012/0231252 A1* | 9/2012 | Arakawa | ................ | B32B 5/024 |
| | | | | 428/219 |
| 2013/0183087 A1* | 7/2013 | Weibel | ..................... | F16B 7/18 |
| | | | | 403/343 |
| 2014/0357777 A1 | 12/2014 | Muramatsu et al. | | |
| 2015/0191583 A1* | 7/2015 | Matsuda | ................ | C08L 77/02 |
| | | | | 524/291 |

FOREIGN PATENT DOCUMENTS

| | | |
|---|---|---|
| JP | 2009-024057 A | 2/2009 |
| JP | 2009-114332 A | 5/2009 |
| JP | 2012-184286 A | 9/2012 |

\* cited by examiner

FIBER-REINFORCED THERMOPLASTIC-RESIN MOLDING MATERIAL

TECHNICAL FIELD

This disclosure relates to a fiber reinforced thermoplastic resin molded article comprising carbon fibers and organic fibers, a fiber reinforced thermoplastic resin molding material, and a method of producing the fiber reinforced thermoplastic resin molding material.

BACKGROUND

Molded articles comprising reinforcement fibers and a thermoplastic resin are lightweight and have excellent mechanical properties, and thus have been widely used, for example, in sports applications, aerospace applications, and general industrial applications. As such reinforcement fibers, metal fibers such as aluminum fibers and stainless fibers, inorganic fibers such as silicon carbide fibers and carbon fibers, organic fibers such as aramid fibers and poly p-phenylene benzoxazole (PBO) fibers, and the like are used. From the standpoint of the balance among specific strength, specific rigidity, and lightness, carbon fibers are preferred, and in particular, polyacrylonitrile (PAN) based carbon fibers are preferably used.

The mechanical properties of a carbon fiber reinforced thermoplastic resin molded article can be enhanced, for example, by increasing the amount of carbon fibers, but an increased amount of carbon fibers tends to result in non-uniform distribution of the carbon fibers in the carbon fiber reinforced thermoplastic resin molded article, often causing a reduction in impact strength. Thus, alternatively, the mechanical properties of a carbon fiber reinforced thermoplastic resin molded article can be enhanced, for example, by adding organic fibers having flexibility and high elongation at break in addition to the carbon fibers.

As a composite fiber reinforced thermoplastic resin pellet comprising organic fibers and inorganic fibers that can provide a molded body with high rigidity and high impact resistance, for example, a composite fiber reinforced thermoplastic resin pellet is disclosed, wherein the ratio of organic fibers/inorganic fibers is 1/1 to 1/10; the ratio of thermoplastic resin/reinforcement fibers is 95/5 to 60/40; and the reinforcement fibers are present twisted and substantially aligned along the longer direction of the pellet together with the thermoplastic resin (see, for example, JP 2009-024057 A). Furthermore, as a long-fiber reinforced composite resin composition having high mechanical strength and provided with conductivity, a long-fiber reinforced composite resin composition comprising an olefin resin, organic long fibers, and carbon fibers is disclosed (see, for example, JP 2009-114332 A). Unfortunately, molded articles obtained using these techniques are still poor in impact strength and low-temperature impact strength.

As a resin composition having fuel barrier properties consistent with impact resistance, a resin composition is disclosed, comprising a mixture of a thermoplastic resin and 4- to 20 mm-long fibers having a melting point higher than that of the thermoplastic resin or being infusible (see, for example, US 2006/068141 A1). Unfortunately, molded articles obtained using such a technique are poor in mechanical properties, particularly, impact strength and low-temperature impact strength.

Thus, it is desirable to develop, by a convenient method, a fiber reinforced thermoplastic resin molded article comprising a thermoplastic resin as a matrix, which is excellent in mechanical properties, particularly, impact strength and low-temperature impact strength, and can exhibit high impact properties.

SUMMARY

We thus provide:

a fiber reinforced thermoplastic resin molded article, comprising 5 to 45 parts by weight of carbon fibers (A), 1 to 45 parts by weight of organic fibers (B), and 20 to 94 parts by weight of a thermoplastic resin (C) based on 100 parts by weight of the total amount of the carbon fibers (A), the organic fibers (B), and the thermoplastic resin (C), wherein the carbon fibers (A) in the fiber reinforced thermoplastic resin molded article have an average fiber length ($L_A$) of 0.3 to 1.5 mm, and an average straight-line distance between two edges of a single fiber ($D_A$), which is a distance from a starting point to an end point of the carbon fibers (A), and the average fiber length ($L_A$) satisfy relationship [1], and the organic fibers (B) in the fiber reinforced thermoplastic resin molded article have an average fiber length ($L_B$) of 1.5 to 4 mm, and an average straight-line distance between two edges of a single fiber ($D_B$), which is a distance from a starting point to an end point of the organic fibers (B), and the average fiber length ($L_B$) satisfy relationship [2]:

$$0.9 \times L_A \leq D_A \leq L_A \quad [1]$$

$$0.1 \times L_B \leq D_B \leq 0.9 \times L_B \quad [2].$$

Furthermore, the fiber reinforced thermoplastic resin molding material has either of the following constitutions:

A fiber reinforced thermoplastic resin molding material, comprising: 5 to 45 parts by weight of carbon fibers (A), 1 to 45 parts by weight of organic fibers (B), 20 to 93 parts by weight of a thermoplastic resin (C), and 1 to 20 parts by weight of a compound (D) having a melt viscosity at 200° C. that is lower than that of the thermoplastic resin (C) based on 100 parts by weight of the total amount of the carbon fibers (A), the organic fibers (B), the thermoplastic resin (C), and the compound (D) having a melt viscosity at 200° C. that is lower than that of the thermoplastic resin (C), wherein the thermoplastic resin (C) is contained at the outer side of a composite (F) obtained by impregnating a fiber bundle (E) comprising the carbon fibers (A) and the organic fibers (B) with the compound (D); the carbon fibers (A) and the organic fibers (B) are unevenly distributed in a cross section of the fiber bundle (E); and the length of the fiber bundle (E) and the length of the fiber reinforced thermoplastic resin molding material are substantially the same; or a fiber reinforced thermoplastic resin molding material, comprising: a carbon fiber reinforced thermoplastic resin molding material (X) comprising 5 to 45 parts by weight of carbon fibers (A), 94 to 35 parts by weight of a thermoplastic resin (C), and 1 to 20 parts by weight of a compound (D) having a melt viscosity at 200° C. that is lower than that of the thermoplastic resin (C) based on 100 parts by weight of the total amount of the carbon fibers (A), the thermoplastic resin (C), and the compound (D) having a melt viscosity at 200° C. that is lower than that of the thermoplastic resin (C), wherein the thermoplastic resin (C) is contained at the outer side of a composite (F) obtained by impregnating the carbon fibers (A) with the compound (D), and the length of the carbon fibers (A) and the length of the carbon fiber reinforced thermoplastic resin molding material are substantially the same; and an organic fiber reinforced thermoplastic resin molding material (Y) comprising 1 to 45 parts by weight of organic fibers (B), 94 to 35 parts by weight of a thermoplastic resin (G), and 1 to 20 parts by weight of a compound (H) based on 100 parts by weight of the total amount of the organic fibers (B), the thermoplastic resin (G), and the compound (H) having a melt viscosity at 200° C. that is lower than that of the thermoplastic resin (G).

A method of producing the fiber reinforced thermoplastic resin molding material, comprising at least the step of dry-blending the carbon fiber reinforced thermoplastic resin molding material (X) and the organic fiber reinforced thermoplastic resin molding material (Y).

The fiber reinforced thermoplastic resin molded article, in which the carbon fibers and the organic fibers each satisfy the specific fiber length described above, produces a high reinforcing effect and has high conductivity and high mechanical properties, particularly, impact strength and low-temperature impact strength. The fiber reinforced thermoplastic resin molded article is very useful for electrical and electronic equipment, office automation equipment, household electrical appliances, housings, automotive parts and the like.

DESCRIPTION OF SYMBOLS

Figure 1:
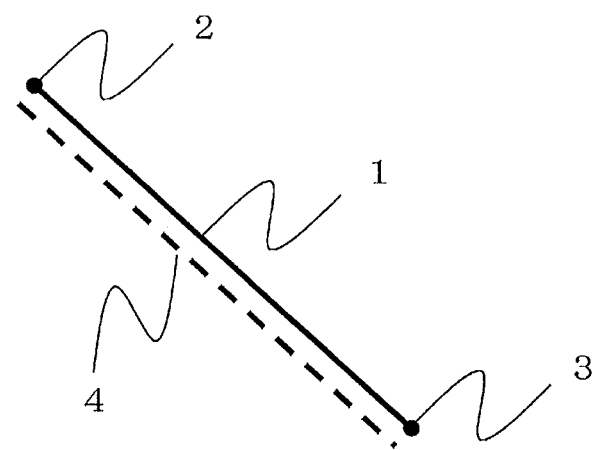
FIG. 1 is a schematic view illustrating a fiber length and a straight-line distance between two edges of a single fiber of the carbon fibers (A) in the molded article.

1: Carbon fiber
2: Starting point of carbon fiber 1
3: End point of carbon fiber 1
4: Distance between two edges of carbon fiber 1
5: Organic fiber
6: Starting point of organic fiber 5
7: End point of organic fiber 5
8: Distance between two edges of organic fiber 5
9: Carbon fiber
10: Organic fiber
11: Thermoplastic resin

DETAILED DESCRIPTION

The fiber reinforced thermoplastic resin molded article (hereinafter also referred to as "molded article") comprises at least carbon fibers (A), organic fibers (B), and a thermoplastic resin (C). Furthermore, the molded article has a structure comprising the carbon fibers (A), the organic fibers (B) present in the curved form, and the thermoplastic resin (C).

Figure 2:
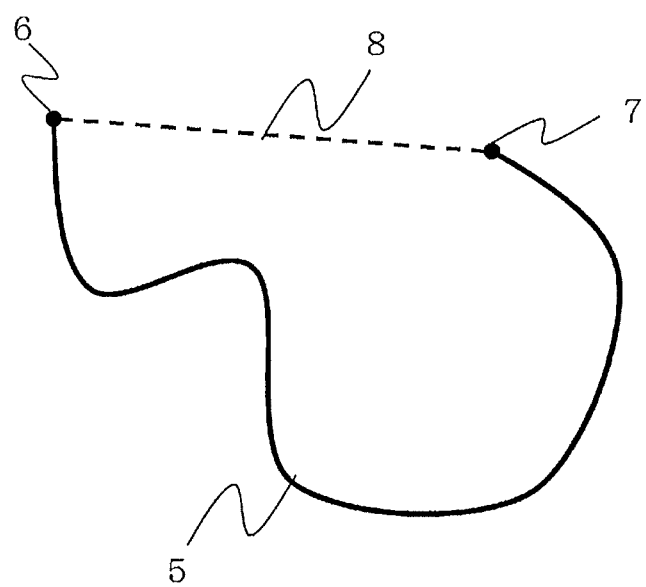
FIG. 2 is a schematic view illustrating a fiber length and a straight-line distance between two edges of a single fiber of the organic fibers (B) in the molded article.

The carbon fibers (A) are continuous reinforcement fiber bundle and serve as a reinforcement material to provide the molded article with high mechanical properties. The organic fibers (B) are also continuous reinforcement fiber bundle and have flexibility. The organic fibers (B), due to their flexibility, are less likely to break during molding, and likely to be present in the curved form in the molded article while keeping their long fiber length. Thus, compared to a fiber bundle composed of the carbon fibers (A) alone, which are rigid, brittle, less prone to entanglement, and prone to breakage, a fiber bundle comprising the organic fibers (B) can serve as a reinforcement material to provide the molded article with high impact strength and high low-temperature impact strength. The thermoplastic resin (C), which is a matrix resin having relatively high viscosity and excellent physical properties such as toughness, firmly holds the carbon fibers (A) and the organic fibers (B) in the molded article. The molded article has a structure in which the carbon fibers (A) and the organic fibers (B) are contained in the thermoplastic resin (C), wherein the carbon fibers (A) are present in a state where a straight-line distance between two edges of a single fiber is substantially equal to its fiber length, whereas the organic fibers (B) are present in a state where a straight-line distance between two edges of a single fiber is shorter than its fiber length, i.e., in a curved state. "A straight-line distance between two edges of a single fiber" herein refers to a straight-line distance from a starting point, one edge of a single fiber, to an end point, the other edge of the single fiber. The rigid fiber and the flexible fiber are in different states in the molded article. We paid attention to the straight-line distance between two edges of a single fiber which may be used as an indicator of the curved state of a fiber. For example, FIG. 1 shows the fiber length and the straight-line distance between two edges of a single fiber of the carbon fibers (A) in the molded article. FIG. 2 shows the fiber length and the straight-line distance between two edges of a single fiber of the organic fibers (B) in the molded article. In FIG. 1, a symbol 1 represents the carbon fiber (A); a symbol 2 represents the starting point of the carbon fiber 1; a symbol 3 represents the end point of the carbon fiber 1; and a symbol 4 represents the distance D between two edges of the carbon fiber 1. In FIG. 2, a symbol 5 represents the organic fiber (B); a symbol 6 represents the starting point of the organic fiber 5; a symbol 7 represents the end point of the organic fiber 5; and a symbol 8 represents the distance D between two edges of the organic fiber 5. As shown in FIG. 1, the carbon fiber (A) typically has a straight-line distance between two edges of a single fiber that is equal to its fiber length, and on the other hand, as shown in FIG. 2, the organic fiber (B), which is curved in the molded article, may have a straight-line distance between two edges of a single fiber that is different from its fiber length.

For the molded article, the ratio of a falling weight impact strength at −20° C. ($I_{-20° C.}$) to a falling weight impact strength at 23° C. ($I_{23° C.}$) is preferably 0.8 or more, which can reduce the decrease in falling weight impact strength at a low temperature. The falling weight impact strength can be determined by performing a falling weight impact test using a weight with a round tup at its tip under the following conditions: weight, 5.1356 kg; falling speed, 0.5 m/sec; and test temperatures, 23° C. and −20° C.

Furthermore, the end face of the organic fibers (B) at break preferably has an inclination with respect to a perpendicular plane to the fiber axis. In this case, the organic fibers (B) are stretch broken at break of the molded article, which allows absorption of a larger amount of energy, leading to improved impact strength. When the organic fibers (B) are present in the molded article with less entanglement between the organic fibers (B) or between the carbon fibers (A) and the organic fibers (B), the end face of the organic fibers (B) at break can have an inclination with respect to a perpendicular plane to the fiber axis. The end face of the carbon fibers (A) is typically perpendicular to the fiber axis and does not have an inclination with respect to a perpendicular plane to the fiber axis. The form of a fiber broken-out section can be observed, for example, by a method in which a cross-section perpendicular to the longer direction of the organic fibers (B) in the molded article is observed under a scanning electron microscope at a magnification of 2,000×, and the micrograph obtained is subjected to image processing and analyzed.

The molded article contains the carbon fibers (A) in an amount of 5 to 45 parts by weight based on 100 parts by weight of the total amount of the carbon fibers (A), the organic fibers (B), and the thermoplastic resin (C). If the amount of the carbon fibers (A) is less than 5 parts by weight, the molded article will have reduced mechanical properties, particularly, flexural properties and impact strength. The amount of the carbon fibers (A) is preferably 10 parts by weight or more. If the amount of the carbon fibers (A) is more than 45 parts by weight, the dispersibility of the carbon fibers (A) in the molded article will be reduced, often causing a reduction in mechanical properties, particularly, impact strength of the molded article. The amount of the carbon fibers (A) is preferably 30 parts by weight or less.

Examples of the type of the carbon fibers (A) include, but are not limited to, PAN-based carbon fibers, pitch-based carbon fibers, cellulose-based carbon fibers, vapor-grown carbon fibers, and graphitized fibers thereof. The PAN-based carbon fibers are carbon fibers made from polyacrylonitrile fibers. The pitch-based carbon fibers are carbon fibers made from petroleum tar or petroleum pitch. The cellulose-based carbon fibers are carbon fibers made from materials such as viscose rayon and cellulose acetate. The vapor-grown carbon fibers are carbon fibers made from materials such as hydrocarbon. Among them, the PAN-based carbon fibers are preferred in terms of excellent balance between strength and elastic modulus. To provide conductivity, carbon fibers coated with metal such as nickel, copper, or ytterbium can also be used.

The carbon fibers (A) preferably have a surface oxygen concentration ratio [O/C] of 0.05 to 0.5. The surface oxygen concentration ratio [O/C] is an atomic ratio of oxygen (O) to carbon (C) on the fiber surface measured by X-ray photoelectron spectroscopy. A surface oxygen concentration ratio of 0.05 or more can ensure a sufficient amount of functional group on the carbon fiber surface, providing stronger adhesion, which further improves mechanical properties, particularly, flexural strength and tensile strength. The surface oxygen concentration ratio is more preferably 0.08 or more, still more preferably 0.1 or more. The upper limit of the surface oxygen concentration ratio is not limited to a particular value, but in terms of balance between handleability and productivity of the carbon fibers, it is typically preferably up to 0.5, more preferably up to 0.4, and still more preferably up to 0.3.

The surface oxygen concentration ratio of the carbon fibers is determined by X-ray photoelectron spectroscopy according to the following procedure. First, a carbon fiber filament from which a sizing agent and the like deposited on the carbon fiber surface have been removed with a solvent is cut into 20-mm lengths, and spread on a sample support made of copper. Thereafter, using AlKα1, 2 as an X-ray source, the inside of a sample chamber is kept at $1\times10^{-8}$ Torr. As a correction value of a peak associated with electrification during the measurement, the kinetic energy value (K.E.) of the main peak of C 1s is set at 1,202 eV. The C 1s peak area is determined by drawing a straight baseline in the K.E. range of 1,191 to 1,205 eV. The 0 1s peak area is determined by drawing a straight baseline in the K.E. range of 947 to 959 eV.

The surface oxygen concentration ratio is calculated as a ratio of the number of atoms from the ratio of the O 1s peak area to the C 1s peak area using an apparatus-specific sensitivity correction value. An X-ray photoelectron spectroscopy apparatus model ES-200 manufactured by Kokusai Denki Co., Ltd. is used, and the sensitivity correction value is set at 1.74.

Examples of the method of controlling the surface oxygen concentration ratio [O/C] at 0.05 to 0.5 include, but are not limited to, electrolytic oxidation, chemical oxidation, and gas phase oxidation, among which electrolytic oxidation is preferred.

The average fiber diameter of the carbon fibers (A), though not critical, is preferably 1 to 20 μm, more preferably 3 to 15 μm from the standpoint of mechanical properties and surface appearance of the molded article. The number of single fibers in a reinforcement fiber filament, though not critical, is preferably 100 to 350,000, and more preferably 20,000 to 100,000 from the standpoint of productivity.

To improve the adhesion between the carbon fibers (A) and the thermoplastic resin (C) (matrix resin), the carbon fibers (A) are preferably subjected to surface treatment. Examples of the surface treatment include electrolytic treatment, ozonation, and UV treatment.

To prevent fluffing of the carbon fibers (A) or improve the adhesion between the carbon fibers (A) and the thermoplastic resin (C) (matrix resin), it is also preferable to provide the carbon fibers with a sizing agent. Specific examples of sizing agents include epoxy resins, phenolic resins, polyethylene glycol, polyurethanes, polyesters, emulsifiers, and surfactants. These may be used in combination of two or more. These sizing agents would be contained on the surface of the carbon fibers (A) in the molding material. The sizing agent is preferably water-soluble or water-dispersible, and epoxy resins which have high wettability with the carbon fibers (A) are preferred. In particular, polyfunctional epoxy resins are more preferred.

Examples of polyfunctional epoxy resins include bisphenol A epoxy resins, bisphenol F epoxy resins, aliphatic epoxy resins, and phenol novolac epoxy resins. Among them, aliphatic epoxy resins, which readily exhibit adhesion to a matrix resin, are preferred. Aliphatic epoxy resins, due to their flexible backbones, tend to have a structure with high toughness even at a high crosslink density. The presence of an aliphatic epoxy resin between the carbon fibers and the matrix resin provides flexibility and low detachability, which can further improve the strength of the molded article. Examples of polyfunctional aliphatic epoxy resins include diglycidyl ether compounds such as ethylene glycol diglycidyl ether, polyethylene glycol diglycidyl ethers, propylene glycol diglycidyl ether, polypropylene glycol diglycidyl ethers, 1,4-butanediol diglycidyl ether, neopentyl glycol diglycidyl ether, polytetramethylene glycol diglycidyl ether, and polyalkylene glycol diglycidyl ethers; and polyglycidyl ether compounds such as glycerol polyglycidyl ether, diglycerol polyglycidyl ether, polyglycerol polyglycidyl ethers, sorbitol polyglycidyl ethers, arabitol polyglycidyl ethers, trimethylolpropane polyglycidyl ethers, trimethylolpropane glycidyl ethers, pentaerythritol polyglycidyl ethers, and polyglycidyl ethers of aliphatic polyhydric alcohols.

Among the aliphatic epoxy resins above, aliphatic polyglycidyl ether compounds having a large number of highly reactive glycidyl groups are more preferred. The aliphatic polyglycidyl ether compounds have a good balance among flexibility, crosslink density, and compatibility with a matrix resin, and can further improve the adhesion. In particular, glycerol polyglycidyl ether, diglycerol polyglycidyl ether, polyethylene glycol glycidyl ethers, and polypropylene glycol glycidyl ethers are still more preferred.

The amount of sizing agent deposited is preferably 0.01 parts by weight to 10 parts by weight based on 100 parts by weight of the carbon fibers (A). When the amount of the sizing agent deposited is 0.01 parts by weight or more, the adhesion to the thermoplastic resin (C) further improves. It is more preferably 0.05 parts by weight or more, still more preferably 0.1 parts by weight or more. When the amount of the sizing agent deposited is 10 parts by weight or less, the physical properties of the thermoplastic resin (C) can be maintained at a higher level. It is more preferably 5 parts by weight or less, still more preferably 2 parts by weight or less.

Examples of the method of providing a sizing agent include, but are not limited to, immersing the carbon fibers in a sizing solution via a roller, contacting the carbon fibers with a roller to which a sizing solution is attached, and spraying a sizing solution on the carbon fibers in the form of a mist. A batch method or a continuous method may be used, but the continuous method, which can achieve high productivity and small variation, is preferred. In such a case, it is preferable to control conditions such as sizing solution concentration, temperature, and yarn tension so that active ingredients in the sizing agent can be deposited on the carbon fibers (A) uniformly in an amount in an appropriate range. Furthermore, it is more preferable to excite the carbon fibers (A) with ultrasonic waves when providing a sizing agent.

The drying temperature and drying time should be adjusted according to the amount of compound to be deposited, and to shorten the time required for completely removing the solvent used to provide a sizing agent and drying, and at the same time, prevent thermal degradation of the sizing agent to thereby prevent solidification of the sized carbon fibers (A) which may lead to deteriorated spreadability, the drying temperature is preferably 150° C. to 350° C., more preferably 180° C. to 250° C.

Examples of solvents used to dilute the sizing agent include water, methanol, ethanol, dimethylformamide, dimethylacetamide, and acetone, and water is preferred from the standpoint of ease of handling and disaster prevention. Thus, when a compound insoluble or poorly soluble in water is used as a sizing agent, it is preferable to add an emulsifier and a surfactant to disperse the compound in water. Specific examples of emulsifiers and surfactants that can be used include anionic emulsifiers such as styrene-maleic anhydride copolymer, olefin-maleic anhydride copolymer, naphthalene sulfonic acid formalin condensate, and sodium polyacrylate; cationic emulsifiers such as polyethyleneimine and polyvinyl imidazoline; and nonionic emulsifiers such as nonylphenol ethylene oxide adducts, polyvinyl alcohol, polyoxyethylene ether ester copolymer, and sorbitan ester ethyl oxide adducts, and the nonionic emulsifiers, which cause little interaction, are preferred because they are less likely to inhibit the adhesive effect of a polyfunctional compound.

In the molded article, the carbon fibers (A) have an average fiber length ($L_A$) of 0.3 to 1.5 mm. Furthermore, the average straight-line distance between two edges of a single fiber ($D_A$) of the carbon fibers (A) and the average fiber length ($L_A$) satisfy relationship [1]:

$$0.9 \times L_A \leq D_A \leq L_A \quad [1].$$

If the average fiber length ($L_A$) of the carbon fibers (A) is less than 0.3 mm, the reinforcing effect of the carbon fibers (A) in the molded article may not be sufficiently exerted, causing a reduction in mechanical properties, particularly, flexural strength and tensile strength. $L_A$ is preferably 0.7 mm or more. On the other hand, an average fiber length ($L_A$) of more than 1.5 mm increases the entanglement between single fibers of the carbon fibers (A), leading to ununiform dispersion in the molded article, which results in a reduction in the above mechanical properties. $L_A$ is preferably 1.2 mm or less. Furthermore, when the average straight-line distance between two edges of a single fiber ($D_A$) does not satisfy relationship [1], the rigid carbon fibers (A) are present in the curved form until immediately before breakage in the molded article, which results in a reduction in mechanical properties, particularly, flexural strength, tensile strength, and impact strength. "Average fiber length" and "average straight-line distance between two edges of a single fiber" herein are not simple number averages calculated by applying the method of calculating a weight average molecular weight to calculation of fiber lengths and straight-line distances between two edges of a single fiber, but refer to an average fiber length and an average straight-line distance between two edges of a single fiber calculated by the following equations that take into account the contribution of fiber lengths and straight-line distances between two edges of a single fiber. Note that the following equations are applicable when the fiber diameters and density of the carbon fibers (A) are uniform:

$$\text{Average fiber length} = \Sigma(Mi^2 \times Ni)/\Sigma(Mi \times Ni)$$

Mi: fiber length (mm)
Ni: number of carbon fibers having a fiber length Mi $$\text{Average straight-line distance between two edges of a single fiber} = \Sigma(Mi'^2 \times Ni')/\Sigma(Mi' \times Ni')$$

Mi': straight-line distance between two edges of a single fiber (mm)
Ni': number of carbon fibers having a straight-line distance between two edges of a single fiber Mi'.

The average fiber length and the average straight-line distance between two edges of a single fiber can be measured by the following method. A molded article sandwiched between glass plates is heated on a hot stage set at 300° C. and uniformly dispersed in the form of a film. The film in which carbon fibers are uniformly dispersed is observed under a light microscope (50 to 200×). The fiber lengths and straight-line distances between two edges of a single fiber of randomly-selected 1,000 carbon fibers (A) are measured, and an average fiber length ($L_A$) and an average straight-line distance between two edges of a single fiber ($D_A$) are calculated by the above equations.

The molded article contains the organic fibers (B) in addition to the carbon fibers (A) described above. Inorganic fibers such as the carbon fibers (A), which are rigid and brittle, are less prone to entanglement and prone to breakage.

Thus, a fiber bundle composed of inorganic fibers alone has drawbacks in that it readily breaks during production of a molded article and readily falls off the molded article. Inclusion of the organic fibers (B), which are flexible, less likely to break, and likely to be present in the curved form in the molded article, can significantly improve the impact strength and low-temperature impact strength of the molded article. The amount of the organic fibers (B) in the molding material is 1 to 45 parts by weight based on 100 parts by weight of the total amount of the carbon fibers (A), the organic fibers (B), and the thermoplastic resin (C). If the amount of the organic fibers (B) is less than 1 part by weight, the mechanical properties, particularly, impact properties and low-temperature impact properties of the molded article will be reduced. The amount of the organic fibers (B) is preferably 5 parts by weight or more. On the other hand, if the amount of the organic fibers (B) is more than 45 parts by weight, the entanglement between fibers will increase, leading to low dispersibility of the organic fibers (B) in the molded article, which often causes a reduction in impact strength of the molded article. The amount of the organic fibers (B) is preferably 30 parts by weight or less.

The single fiber fineness of the organic fibers (B) is preferably 0.1 to 10 dtex, more preferably 0.5 to 5 dtex. Furthermore, to adjust the average fiber length and the average straight-line distance between two edges of a single fiber of the organic fibers such that relationship [2] described below are satisfied to thereby further improve impact properties and low-temperature impact properties, the tensile break elongation of the organic fibers (B) is preferably 10% or more, more preferably 20% or more. To improve fiber strength and rigidity of the molded article, the tensile break elongation of the organic fibers (B) is preferably 50% or less, more preferably 40% or less.

The tensile break elongation (%) of the organic fibers (B) can be measured by the following method. A tensile test is carried out in a room under standard conditions (20° C., 65% RH) at a chuck distance of 250 mm and a tensile speed of 300 mm/min, and a length at fiber break is measured (breakages in the vicinity of chucks are considered as a chucking breakage and excluded from a data), calculated to the second decimal place by the following equation, and rounded to one decimal place. The average value of three data is defined as the tensile break elongation.

Tensile break elongation (%)=[(length at break (mm)−250)/250]×100

The organic fibers (B) can be selected as appropriate without significantly reducing the mechanical properties of the molded article. Examples thereof include fibers obtained by spinning polyolefin resins such as polyethylene and polypropylene; polyamide resins such as nylon 6, nylon 66, and aromatic polyamide; polyester resins such as polyethylene terephthalate and polybutylene terephthalate; and resins such as polyether ketone, polyether sulfone, polyarylene sulfide, and liquid crystal polyester. These may be used in combination of two or more. It is preferable to appropriately select from these organic fibers (B) according to the combination with the thermoplastic resin (C) (matrix resin). In particular, the melting temperature of the organic fibers (B) is preferably higher than the molding temperature (melting temperature) of the thermoplastic resin (C) by 30° C. to 150° C., more preferably by 50° C. to 100° C. Alternatively, organic fibers (B) obtained using a resin incompatible with the thermoplastic resin (C) are preferred because they are present in the molded article while maintaining its fibrous state and therefore can further improve the impact strength and low-temperature impact strength of the molded article.

Examples of the organic fibers (B) having a high melting temperature include polyamide fibers, polyester fibers, polyphenylene sulfide fibers, and fluororesin fibers, and it is preferable to use at least one fiber selected from the group consisting of these fibers as the organic fibers (B).

In the molded article, the organic fibers (B) have an average fiber length ($L_B$) of 1.5 mm to 4 mm. Furthermore, the average straight-line distance between two edges of a single fiber ($D_B$) of the organic fibers (B) and the average fiber length ($L_B$) satisfy relationship [2]:

$$0.1 \times L_B \leq D_B \leq 0.9 \times L_B \quad [2].$$

If the average fiber length ($L_B$) of the organic fibers (B) is less than 1.5 mm, the reinforcing effect of the organic fibers (B) in the molded article may not be sufficiently exerted, reducing mechanical properties, particularly, impact strength. $L_B$ is preferably 1.9 mm or more. On the other hand, an average fiber length ($L_B$) of more than 4 mm increases the entanglement between single fibers of the organic fibers (B), leading to ununiform dispersion in the molded article, which results in a reduction in the above mechanical properties. $L_B$ is preferably 3 mm or less. Furthermore, when the average straight-line distance between two edges of a single fiber ($D_B$) does not satisfy the above relationship [2], the organic fibers (B) are present not curved but more linearly in the molded article, leading to a reduced fiber reinforcing effect at break of the molded article, which results in a reduction in mechanical properties, particularly, impact strength, falling weight impact strength, and low-temperature falling weight impact strength. Similarly to the carbon fibers (A), "average fiber length" and "average straight-line distance between two edges of a single fiber" of the organic fibers (B) herein are not simple number averages calculated by applying the method of calculating a weight average molecular weight to calculation of fiber lengths and straight-line distances between two edges of a single fiber, but refer to an average fiber length and an average straight-line distance between two edges of a single fiber calculated by the following equations that take into account the contribution of fiber lengths and straight-line distances between two edges of a single fiber. Note that the following equations are applicable when the fiber diameters and density of the organic fibers (B) are uniform:

Average fiber length=$\Sigma(Mi^2 \times Ni)/\Sigma(Mi \times Ni)$

Mi: fiber length (mm)
Ni: number of organic fibers having a fiber length Mi

Average straight-line distance between two edges of a single fiber=$\Sigma(Mi'^2 \times Ni')/\Sigma(Mi' \times Ni')$ Mi': straight-line distance between two edges of a single fiber (mm)
Ni': number of organic fibers having a straight-line distance between two edges of a single fiber Mi'.

The average fiber length and the average straight-line distance between two edges of a single fiber can be measured by the following method. A molded article sandwiched between glass plates is heated on a hot stage set at 300° C. and uniformly dispersed in the form of a film. The film in which organic fibers are uniformly dispersed is observed under a light microscope (50 to 200×). The fiber lengths and straight-line distances between two edges of a single fiber of randomly-selected 1,000 organic fibers (B) are measured, and an average fiber length ($L_B$) and an average straight-line distance between two edges of a single fiber ($D_B$) are calculated by the above equations.

The average straight-line distance between two edges of a single fiber ($D_B$) of the organic fibers (B) in the molded article can be adjusted, for example, according to the type of the organic fibers (B) above and the conditions of molding. Examples of the conditions of molding, in the case of injection molding, include pressure conditions such as back pressure and holding pressure, time conditions such as injection time and pressure holding time, and temperature conditions such as cylinder temperature and mold temperature.

The molded article contains the thermoplastic resin (C) in an amount of 20 to 94 parts by weight, more preferably 20 to 93 parts by weight based on 100 parts by weight of the total amount of the carbon fibers (A), the organic fibers (B), and the thermoplastic resin (C).

The thermoplastic resin (C) preferably has a molding temperature (melting temperature) of 200 to 450° C., and examples include polyolefin resins, polystyrene resins, polyamide resins, vinyl halide resins, polyacetal resins, saturated polyester resins, polycarbonate resins, polyarylsulfone resins, polyarylketone resins, polyphenylene ether resins, polyphenylene sulfide resins, polyaryl ether ketone resins, polyethersulfone resins, polyphenylene sulfide sulfone resins, polyarylate resins, polyamide resins, liquid crystal polyester resins, and fluororesins, all of which act as an electrical insulator. These may be used in combination of two or more.

Among the thermoplastic resins (C) above, polyolefin resins, polyamide resins, and polycarbonate resins, which are lightweight and have an excellent balance between mechanical properties and moldability, are more preferred, and polypropylene resins, which are excellent also in chemical resistance and hygroscopicity, are still more preferred.

The polypropylene resins herein include those which are unmodified and those which are modified. Specific examples of unmodified polypropylene resins include propylene homopolymer, and copolymers of propylene and at least one α-olefin, a conjugated diene, an unconjugated diene, or the like. Examples of α-olefins include $C_2$-$C_{12}$ α-olefins excluding propylene such as ethylene, 1-butene, β-methyl-1-butene, 4-methyl-1-pentene, β-methyl-1-pentene, 4-methyl-1-hexene, 4,4-dimethyl-1-hexene, 1-nonene, 1-octene, 1-heptene, 1-hexene, 1-decene, 1-undecene, and 1-dodecene. Examples of conjugated dienes and unconjugated dienes include butadiene, ethylidene norbornene, dicyclopentadiene, and 1,5-hexadiene. These may be used in combination of two or more. Examples of the backbone structure of the unmodified polypropylene resin include propylene homopolymer, random or block copolymers of propylene and any other monomer, and random or block copolymers of propylene and any other thermoplastic monomer. Preferred examples include polypropylene, ethylene-propylene copolymers, propylene-1-butene copolymers, and ethylene-propylene-1-butene copolymers. Propylene homopolymer is preferred to further improve the rigidity of the molded article, and random or block copolymers of propylene and any other monomer are preferred to further improve the impact strength of the molded article.

The modified polypropylene resin is preferably an acid-modified polypropylene resin, more preferably a polypropylene resin having a group of carboxylic acid and/or a salt thereof bonded to a polymer chain. Such an acid-modified polypropylene resin can be obtained by various methods, for example, graft polymerization of a polypropylene resin with a monomer having a carboxylic acid group that is neutralized or not neutralized or a monomer having a carboxylic acid ester that is saponificated or not saponificated.

Examples of the monomer having a carboxylic acid group that is neutralized or not neutralized and the monomer having a carboxylic acid ester group that is saponificated or not saponificated include ethylenically unsaturated carboxylic acids, anhydrides thereof, esters thereof, and furthermore, compounds having an unsaturated vinyl group other than olefins.

Examples of ethylenically unsaturated carboxylic acids include (meth)acrylic acid, maleic acid, fumaric acid, tetrahydrophthalic acid, itaconic acid, citraconic acid, crotonic acid, and isocrotonic acid, and examples of anhydrides thereof include nadic acid TM (endocisbicyclo[2,2,1]hept-5-ene-2,3-dicarboxylic acid), maleic anhydride, and citraconic anhydride.

Examples of esters of ethylenically unsaturated carboxylic acids include (meth)acrylic acid esters such as methyl (meth)acrylate, ethyl (meth)acrylate, propyl (meth)acrylate, n-butyl (meth)acrylate, iso-butyl (meth)acrylate, tert-butyl (meth)acrylate, n-amyl (meth)acrylate, isoamyl (meth)acrylate, n-hexyl (meth)acrylate, 2-ethylhexyl (meth)acrylate, octyl (meth)acrylate, decyl (meth)acrylate, dodecyl (meth)acrylate, octadecyl (meth)acrylate, stearyl (meth)acrylate, tridecyl (meth)acrylate, lauroyl (meth)acrylate, cyclohexyl (meth)acrylate, benzyl (meth)acrylate, phenyl (meth)acrylate, isobornyl (meth)acrylate, dicyclopentanyl (meth)acrylate, dicyclopentenyl (meth)acrylate, dimethyl aminoethyl (meth)acrylate, and diethylaminoethyl (meth)acrylate; hydroxyl group-containing (meth)acrylic acid esters such as hydroxyethyl acrylate, 2-hydroxyethyl (meth)acrylate, 2-hydroxypropyl (meth)acrylate, 4-hydroxybutyl acrylate, lactone-modified hydroxyethyl (meth)acrylate, and 2-hydroxy-3-phenoxypropyl acrylate; epoxy group-containing (meth) acrylic acid esters such as glycidyl (meth)acrylate and methyl glycidyl (meth)acrylate; and aminoalkyl (meth)acrylates such as N,N-dimethyl aminoethyl (meth)acrylate, N,N-di ethyl aminoethyl (meth)acrylate, N,N-dimethyl aminopropyl (meth)acrylate, N,N-di propyl aminoethyl (meth) acrylate, N,N-dibutylaminoethyl (meth)acrylate, and N,N-dihydroxyethylaminoethyl (meth)acrylate.

Examples of monomers having an unsaturated vinyl group other than olefins include isocyanate group-containing vinyls such as vinyl isocyanate and isopropenyl isocyanate; aromatic vinyls such as styrene, α-methylstyrene, vinyl toluene, and t-butyl styrene; amide group-containing vinyls such as acrylamide, methacryl amide, N-methylol methacryl amide, N-methyl olacrylamide, diacetone acrylamide, and maleic acid amide; vinyl esters such as vinyl acetate and vinyl propionate; unsaturated sulfonic acids such as styrenesulfonic acid, sodium styrenesulfonate, and 2-acrylamido-2-methylpropanesulfonic acid; and unsaturated phosphoric acids such as mono(2-methacryloyloxyethyl) acid phosphate and mono(2-acryloyloxyethyl) acid phosphate.

These may be used in combination of two or more. Among them, ethylenically unsaturated carboxylic acid anhydrides are preferred, and maleic anhydride is more preferred.

To improve the mechanical properties, particularly, flexural strength and tensile strength of the molded article, it is preferable to use both an unmodified polypropylene resin and a modified polypropylene resin, and particularly from the standpoint of the balance between flame resistance and mechanical properties, the weight ratio of the unmodified polypropylene resin to the modified polypropylene resin is preferably 95/5 to 75/25, more preferably 95/5 to 80/20, and still more preferably 90/10 to 80/20.

The polyamide resins are resins produced using amino acids, lactams, or diamines and dicarboxylic acids as main materials. Typical examples of the main materials include amino acids such as 6-aminocaproic acid, 11-aminoundecanoic acid, 12-aminododecanoic acid, and paminomethyl benzoic acid; lactams such as ε-caprolactam and ω-laurolactam; aliphatic diamines such as tetramethylenediamine, hexamethylenediamine, 2-methylpentamethylenediamine, nonamethylenediamine, undecamethylenediamine, dodecamethylenediamine, 2,2,4-/2,4,4-trimethylhexamethylenediamine, and 5-methylnonamethylenediamine; aromatic diamines such as mxylylenediamine and p-xylylenediamine; alicyclic diamines such as 1,3-bis(aminomethyl)cyclohexane, 1,4-bis(aminomethyl)cyclohexane, 1-amino-3-aminomethyl-3,5,5-trimethylcyclohexane, bis(4-aminocyclohexyl)methane, bis(3-methyl-4-aminocyclohexyl)methane, 2,2-bis(4-aminocyclohexyl)propane, bis(aminopropyl)piperazine, and aminoethylpiperazine; aliphatic dicarboxylic acids such as adipic acid, suberic acid, azelaic acid, sebacic acid, and dodecanedioic acid; aromatic dicarboxylic acids such as terephthalic acid, isophthalic acid, 2-chloroterephthalic acid, 2-methylterephthalic acid, 5-methylisophthalic acid, 5-sodium sulfoisophthalic acid, hexahydroterephthalic acid, and hexahydroisophthalic acid; and alicyclic dicarboxylic acids such as 1,4-cyclohexanedicarboxylic acid, 1,3-cyclohexanedicarboxylic acid, and 1,2-cyclohexanedicarboxylic acid. These may be used in combination of two or more.

Polyamide resins having a melting point of 200° C. or higher, which are excellent in heat resistance and strength, are particularly advantageous. Specific examples thereof include polycaproamide (nylon 6), polyhexamethylene adipamide (nylon 66), polycaproamide/polyhexamethylene adipamide copolymer (nylon 6/66), polytetramethylene adipamide (nylon 46), polyhexamethylene sebacamide (nylon 610), polyhexamethylene dodecamide (nylon 612), polyhexamethylene terephthalamide/polycaproamide copolymer (nylon 6T/6), polyhexamethylene adipamide/polyhexamethylene terephthalamide copolymer (nylon 66/6T), polyhexamethylene adipamide/polyhexamethylene isophthalamide copolymer (nylon 66/6I), polyhexamethylene adipamide/polyhexamethylene terephthalamide/polyhexamethylene isophthalamide copolymer (nylon 66/6T/6I), polyhexamethylene terephthalamide/polyhexamethylene isophthalamide copolymer (nylon 6T/6I), polyhexamethylene terephthalamide/polydodecane amide copolymer (nylon 6T/12), polyhexamethylene terephthalamide/poly(2-methylpentamethylene) terephthalamide copolymer (nylon 6T/M5T), polyxylylene adipamide (nylon XD6), polynonamethylene terephthalamide (nylon 9T), and copolymers thereof. These may be used in combination of two or more. Among them, nylon 6 and nylon 66 are more preferred.

The degree of polymerization of such polyamide resins is not critical, and polyamide resins are preferred having a relative viscosity, as measured at 25° C. in a solution of 0.25 g of polyamide resin in 25 mL of 98% concentrated sulfuric acid, in the range of 1.5 to 5.0, particularly in the range of 2.0 to 3.5.

The polycarbonate resins are obtained by reacting a dihydric phenol with a carbonate precursor. Copolymers obtained using two or more dihydric phenols or two or more carbonate precursors may be used. Examples of the reaction method include interfacial polymerization, melt transesterification, solid phase transesterification of a carbonate prepolymer, and ringopening polymerization of a cyclic carbonate compound. Such polycarbonate resins are known per se and, for example, the polycarbonate resin disclosed in JP 2002-129027 A can be used.

Examples of dihydric phenols include 1,1-bis(4-hydroxyphenyl)-3,3,5-trimethylcyclohexane, bis(4-hydroxyphenyl) alkane (e.g., bisphenol A), 2,2-bis{(4-hydroxy-3-methyl) phenyl}propane, α,α'-bis(4-hydroxyphenyl)-m-diisopropylbenzene, and 9,9-bis(4-hydroxy-3-methylphenyl)fluorene. These may be used in combination of two or more. Among them, bisphenol A is preferred which can provide a polycarbonate resin with higher impact resistance. Copolymers obtained using bisphenol A and any other dihydric phenol are excellent in high heat resistance or low water absorption.

Examples of carbonate precursors used include carbonyl halides, carbonic acid diesters, and haloformates, and specific examples include phosgene, diphenyl carbonate, and dihaloformates of a dihydric phenol.

In preparation of a polycarbonate resin from such a dihydric phenol and a carbonate precursor, catalysts, terminal blocking agents, antioxidants for preventing oxidation of the dihydric phenol, and the like may optionally be used.

The polycarbonate resin includes branched polycarbonate resins obtained by copolymerization of a tri- or more polyfunctional aromatic compound, polyester carbonate resins obtained by copolymerization of an aromatic or aliphatic (including alicyclic) difunctional carboxylic acid, copolymerized polycarbonate resins obtained by copolymerization of a difunctional (including alicyclic) alcohol, and polyester carbonate resins obtained by copolymerization of both of such a difunctional carboxylic acid and a difunctional alcohol. These polycarbonate resins are also known. These polycarbonate resins may be used in combination of two or more.

The molecular weight of the polycarbonate resin, though not critical, is preferably 10,000 to 50,000 in terms of viscosity average molecular weight. A viscosity average molecular weight of 10,000 or more can further improve the strength of the molded article. It is more preferably 15,000 or more, still more preferably 18,000 or more. A viscosity average molecular weight of 50,000 or less improves moldability. It is more preferably 40,000 or less, still more preferably 30,000 or less. When two or more polycarbonate resins are used, it is preferred that at least one of the polycarbonate resins have a viscosity average molecular weight in the range described above. In such a case, the other polycarbonate resin(s) preferably has a viscosity average molecular weight of more than 50,000, preferably more than 80,000. Such a polycarbonate resin has a high entropy elasticity, is advantageous when molding such as gas-assisted molding is used, and exhibits properties derived from the high entropy elasticity (anti-drip properties, drawdown properties, and properties of improving melt properties such as jetting).

The viscosity average molecular weight (M) of the polycarbonate resin was determined by substituting a specific viscosity ($\eta sp$) of a solution of 0.7 g of the polycarbonate resin in 100 mL of methylene chloride, as measured at 20° C., into the following equation:

$\eta sp/c = [\eta] + 0.45 \times [\eta]^2 c$ (where $[\eta]$ is a limiting viscosity)

$[\eta] = 1.23 \times 10^{-4} M^{0.83}$ $C = 0.7$.

The molded article may include a compound having a number average molecular weight of 200 to 50,000 in addition to the carbon fibers (A), the organic fibers (B), and the thermoplastic resin (C). The compound having a number average molecular weight of 200 to 50,000, at normal temperature, is typically a solid that is relatively brittle and easily broken or a liquid. Such a compound, due to its low molecular weight, is highly flowable, and can promote dispersion of the carbon fibers (A) and the organic fibers (B) in the thermoplastic resin (C). In other words, a number average molecular weight of 200 or more can further improve the mechanical properties of the molded article, particularly, flexural strength and tensile strength. The number average molecular weight is more preferably 1,000 or more. A number average molecular weight of 50,000 or less, which means that the compound has an appropriately low viscosity, provides excellent impregnation into the carbon fibers (A) and the organic fibers (B) contained in the molded article, and can further improve the dispersibility of the carbon fibers (A) and the organic fibers (B) in the molded article. The number average molecular weight is more preferably 3,000 or less. The number average molecular weight of such a compound can be determined using gel permeation chromatography (GPC).

The melt viscosity at 200° C. of the compound having a number average molecular weight of 200 to 50,000 is preferably lower than the melt viscosity of the thermoplastic resin (C). The melt viscosity at 200° C. of a compound (D) having a melt viscosity at 200° C. lower than that of the thermoplastic resin (C) (also referred to as "compound (D)") is preferably 5 Pa·s or lower, more preferably 2 Pa·s or lower, and still more preferably 1.5 Pa·s or lower. Adjusting the melt viscosity at 200° C. to be in this range can further improve the dispersibility of the carbon fibers (A) and the organic fibers (B) and the mechanical properties, particularly, flexural strength and tensile strength of the molded article. The melt viscosity at 200° C. of the thermoplastic resin (C) and the compound (D) can be measured with a viscoelasticity meter at 0.5 Hz using a 40-mm parallel plate.

The compound (D) is preferably selected as appropriate according to the combination with the thermoplastic resin (C). For example, a terpene resin is preferably used when the molding temperature is 150° C. to 270° C., and an epoxy resin is preferably used at 270° C. to 320° C.

The amount of the compound (D) in the molded article is preferably 1 to 20 parts by weight based on 100 parts by weight of the total amount of the carbon fibers (A), the organic fibers (B), and the thermoplastic resin (C). The compound (D) in an amount of 1 part by weight or more further improves the flowability of the carbon fibers (A) and the organic fibers (B) in the molded article, leading to further improved dispersibility. The amount of the compound (D) is preferably 2 parts by weight or more, more than preferably 4 parts by weight or more. The compound (D) in an amount of 20 parts by weight or less can further improve the mechanical properties, particularly, flexural strength, tensile strength, and impact strength of the molded article. The amount of the compound (D) is preferably 15 parts by weight or less, more preferably 12 parts by weight or less, and still more preferably 10 parts by weight or less.

During molding temperatures at a heating rate of 10° C./min (in air), the compound (D) preferably shows a weight loss on heating of up to 5% by weight, more preferably up to 3% by weight. A weight loss on heating of up to 5% by weight can reduce decomposition gas that may generate when the carbon fibers (A) and the organic fibers (B) are impregnated with the compound (D), leading to reduced void formation after molding. The gas generation can be reduced particularly in high-temperature molding.

The weight loss of the compound (D) during molding temperatures can be determined by measuring weights during molding temperatures by thermogravimetric analysis (TGA) using a platinum sample pan in an air atmosphere at a heating rate of 10° C./min.

The rate of change of melt viscosity of the compound (D) after heating at 200° C. for 2 hours is preferably 1.5 or less, more preferably 1.3 or less. A rate of change of melt viscosity after heating at 200° C. for 2 hours of 1.5 or less can achieve stable production and prevent uneven deposition.

The rate of change of melt viscosity of the compound (D) can be determined by the following method. First, a melt viscosity at 200° C. is measured with a viscoelasticity meter at 0.5 Hz using a 40-mm parallel plate. The compound (D) is allowed to stand in a hot-air dryer at 200° C. for 2 hours, after which a melt viscosity at 200° C. is measured in a similar manner, and a rate of change of viscosity is calculated using the following equation:

Rate of change of melt viscosity=melt viscosity at 200° C. after heating at 200° C. for 2 hours/ melt viscosity at 200° C. before heating at 200° C. for 2 hours.

The epoxy resin suitably used as the compound (D) refers to a compound having two or more epoxy groups, wherein the compound includes substantially no curing agent and does not undergo curing due to what is called three-dimensional cross-linking even when heated. The compound (D) preferably has a glycidyl group, which facilitates interaction with the carbon fibers (A) and the organic fibers (B), compatibility with a fiber bundle (E), and impregnation. Furthermore, the dispersibility of the carbon fibers (A) and the organic fibers (B) during molding further improves.

Examples of the compound having a glycidyl group include glycidyl ether epoxy resins, glycidyl ester epoxy resins, glycidyl amine epoxy resins, and alicyclic epoxy resins. These may be used in combination of two or more.

Examples of glycidyl ether epoxy resins include bisphenol A epoxy resins, bisphenol F epoxy resins, bisphenol AD epoxy resins, halogenated bisphenol A epoxy resins, bisphenol S epoxy resins, resorcinol epoxy resins, hydrogenated bisphenol A epoxy resins, phenol novolac epoxy resins, cresol novolac epoxy resins, aliphatic epoxy resins having an ether bond, naphthalene epoxy resins, biphenyl epoxy resins, biphenyl aralkyl epoxy resins, and dicyclopentadiene epoxy resins.

Examples of glycidyl ester epoxy resins include hexahydrophthalic acid glycidyl ester and dimer acid diglycidyl ester.

Examples of glycidyl amine epoxy resins include triglycidyl isocyanurate, tetraglycidyl diaminodiphenylmethane, tetraglycidyl m-xylenediamine, and aminophenol epoxy resins.

Examples of alicyclic epoxy resins include 3,4-epoxy-6-methyl cyclohexylmethyl carboxylate and 3,4-epoxycyclohexylmethyl carboxylate.

Above all, in terms of excellent balance between viscosity and heat resistance, glycidyl ether epoxy resins are preferred, and bisphenol A epoxy resins and bisphenol F epoxy resins are more preferred.

The number average molecular weight of the epoxy resin is preferably 200 to 5,000. When the number average molecular weight of the epoxy resin is 200 or more, the mechanical properties of the molded article can br further improved. The number average molecular weight of the epoxy resin is more preferably 800 or more, still more preferably 1,000 or more. When the number average molecular weight of the epoxy resin is 5,000 or less, excellent impregnation into the fiber bundle (E) is provided, and the dispersibility of the carbon fibers (A) and the organic fibers (B) can be further improved. The number average molecular weight of the epoxy resin is more preferably 4,000 or less, still more preferably 3,000 or less. The number average molecular weight of the epoxy resin can be determined using gel permeation chromatography (GPC).

Examples of terpene resins include polymers and copolymers obtained by polymerization of terpene monomers optionally with aromatic monomers in an organic solvent in the presence of a Friedel-Crafts catalyst.

Examples of terpene monomers include monocyclic monoterpenes such as α-pinene, β-pinene, dipentene, d-limonene, myrcene, allo-ocimene, ocimene, α-phellandrene, α-terpinene, γ-terpinene, terpinolene, 1,8-cineol, 1,4-cineol, α-terpineol, β-terpineol, γ-terpineol, sabinene, pmenthadienes, and carenes. Examples of aromatic monomers include styrene and α-methylstyrene.

Among them, α-pinene, β-pinene, dipentene, and d-limonene, which have high compatibility with the thermoplastic resin (C), are preferred, and homopolymers of these terpene monomers are more preferred. Furthermore, hydrogenated terpene resins obtained by hydrogenation of these terpene resins, which have even higher compatibility with the thermoplastic resin (C), particularly, a polypropylene resin, are preferred.

The glass transition temperature of the terpene resin, though not critical, is preferably 30 to 100° C. A glass transition temperature of 30° C. or higher makes it easy to handle the compound (D) during molding. A glass transition temperature of 100° C. or lower makes it possible to moderately control the compound (D) during molding, leading to improved moldability.

The number average molecular weight of the terpene resin is preferably 200 to 5,000. A number average molecular weight of 200 or more can further improve the mechanical properties, particularly, flexural strength and tensile strength of the molded article. A number average molecular weight of 5,000 or less, which means that the terpene resin has an appropriately low viscosity, provides excellent impregnation, and can further improve the dispersibility of the carbon fibers (A) and the organic fibers (B) in the molded article. The number average molecular weight of the terpene resin can be determined using gel permeation chromatography (GPC).

The molded article may contain other components in addition to (A) to (D) without adverse affecting. Examples of other components include thermosetting resins, inorganic fillers other than carbon fibers, flame retardants, conductivity-imparting agents, crystal nucleating agents, UV absorbers, antioxidants, vibration dampers, antimicrobial agents, insect repellents, deodorizers, stain inhibitors, heat stabilizers, mold releasing agents, antistatic agents, plasticizers, lubricants, coloring agents, pigments, dyes, foaming agents, foam suppressors, and coupling agents.

A method of producing the molding material and a method of producing the molded article will now be described.

The molding material can be obtained, for example, by the following method. First, a roving of carbon fibers (A) and a roving of organic fibers (B) are doubled in parallel to the longer direction of fiber to prepare a fiber bundle (E) having the carbon fibers (A) and the organic fibers (B). The fiber bundle (E) is then impregnated with a molten compound (D) to prepare a composite (F). The composite (F) is guided to an impregnation die filled with a molten thermoplastic resin (C) to coat the outer surface of the composite (F) with the thermoplastic resin (C), and pultruded through a nozzle. The pultruded product is cooled and solidified, and then pelletized to a predetermined length to obtain a molding material. The thermoplastic resin (C) may be impregnated into the fiber bundle (E) as long as it is contained at the outer side of the composite (F).

The molding material obtained can be molded to produce a molded article. A preferred molding method is molding using a die, and in particular, molding using an injection molding machine can continuously provide stable molded articles. The conditions of injection molding is not particularly restricted and, for example, preferred conditions are as follows: injection time: 0.5 seconds to 10 seconds, more preferably 2 seconds to 10 seconds; back pressure: 0.1 MPa to 10 MPa, more preferably 2 MPa to 8 MPa; holding pressure: 1 MPa to 50 MPa, more preferably 1 MPa to 30 MPa; pressure holding time: 1 second to 20 seconds, more preferably 5 seconds to 20 seconds; cylinder temperature: 200° C. to 320° C., mold temperature: 20° C. to 100° C. The cylinder temperature refers to a temperature of a portion for heating and melting a molding material in the injection molding machine, and the mold temperature refers to a temperature of a die into which a resin is injected for a desired shape. By appropriately selecting these conditions, particularly, injection time, back pressure, and mold temperature, the length of reinforcement fibers and the straight-line distance between two edges of a single fiber in the molded article can be readily adjusted to satisfy relationships [1] and [2].

The fiber reinforced thermoplastic resin molding material (also referred to as "molding material") that is suitable to produce the molded article will now be described. (1) A fiber reinforced thermoplastic resin molding material (hereinafter also referred to as "molding material according to a first configuration") and (2) a molding material (hereinafter also referred to as "molding material according to a second configuration") can be suitably used as a molding material to produce the molded article. The molding material according to a first configuration comprises 5 to 45 parts by weight of carbon fibers (A), 1 to 45 parts by weight of organic fibers (B), 20 to 93 parts by weight of a thermoplastic resin (C), and 1 to 20 parts by weight of a compound (D) having a melt viscosity at 200° C. that is lower than that of the thermoplastic resin (C) based on 100 parts by weight of the total amount of the carbon fibers (A), the organic fibers (B), the thermoplastic resin (C), and the compound (D) having a melt viscosity at 200° C. that is lower than that of the thermoplastic resin (C), wherein the thermoplastic resin (C) is contained at the outer side of a composite (F) obtained by impregnating a fiber bundle (E) comprising the carbon fibers (A) and the organic fibers (B) with the compound (D); the carbon fibers (A) and the organic fibers (B) are unevenly distributed in a cross section of the fiber bundle (E); and the length of the fiber bundle (E) and the length of the fiber reinforced thermoplastic resin molding material are substantially the same. The molding material according to a second configuration comprises a carbon fiber reinforced thermoplastic resin molding material (X) comprising 5 to 45 parts by weight of carbon fibers (A), 94 to 35 parts by weight of a thermoplastic resin (C), and 1 to 20 parts by weight of a compound (D) having a melt viscosity at 200° C. that is lower than that of the thermoplastic resin (C) based on 100 parts by weight of the total amount of the carbon fibers (A), the thermoplastic resin (C), and the compound (D) having a melt viscosity at 200° C. that is lower than that of the thermoplastic resin (C), wherein the thermoplastic resin (C)

is contained at the outer side of a composite (F) obtained by impregnating the carbon fibers (A) with the compound (D), and the length of the carbon fibers (A) and the length of the carbon fiber reinforced thermoplastic resin molding material are substantially the same; and an organic fiber reinforced thermoplastic resin molding material (Y) comprising 1 to 45 parts by weight of organic fibers (B), 94 to 35 parts by weight of a thermoplastic resin (G), and 1 to 20 parts by weight of a compound (H) based on 100 parts by weight of the total amount of the organic fibers (B), the thermoplastic resin (G), and the compound (H) having a melt viscosity at 200° C. that is lower than that of the thermoplastic resin (G).

First, the molding material according to the first configuration will be described. The molding material according to the first configuration used to produce the molded article described above comprises at least carbon fibers (A), organic fibers (B), a thermoplastic resin (C), and a compound (D) having a melt viscosity at 200° C. that is lower than that of the thermoplastic resin (C) (also referred to as "compound (D)"). Furthermore, the molding material according to the first configuration has a structure comprising a composite (F) obtained by impregnating a fiber bundle (E) comprising the carbon fibers (A) and the organic fibers (B) with the compound (D), the thermoplastic resin (C) being contained at the outer side of the composite (F).

Compared to a fiber bundle composed of the carbon fibers (A) alone, which are rigid, brittle, less prone to entanglement, and prone to breakage, the fiber bundle (E) comprising the organic fibers (B) can serve as a reinforcement material to provide the molded article with higher impact strength and higher low-temperature impact strength. The thermoplastic resin (C) firmly holds the carbon fibers (A) and the organic fibers (B) in the molded article. These effects were as described above with respect to the molded article. The compound (D) forms a composite together with the fiber bundle (E), and assists a matrix resin (the thermoplastic resin (C)) to impregnate into the fiber bundle (E) during molding and assist the carbon fibers (A) and the organic fibers (B) to disperse in the matrix resin (the thermoplastic resin (C)), i.e., acts as what is called an impregnation aid and a dispersion aid.

The molding material according to the first configuration has the composite (F) including the thermoplastic resin (C) in which gaps between single fibers of the carbon fibers (A) and the organic fibers (B) in the form of a continuous fiber bundle are filled with the compound (D). The composite (F) has a structure in which the carbon fibers (A) and the organic fibers (B) are dispersed like islands in a sea of the compound (D).

The molding material according to the first configuration comprises the thermoplastic resin (C) at the outer side of the composite (F) obtained by impregnating the fiber bundle (E) with the compound (D). A structure is preferred in which the thermoplastic resin (C) is disposed surrounding the composite (F) in a cross-section perpendicular to the longer direction of the molding material, or the composite (F) and the thermoplastic resin (C) are disposed in layers, the thermoplastic resin (C) being the outermost layer.

In the molding material according to the first configuration, the compound (D) in most cases is of low molecular weight, and at normal temperature, it is typically a solid that is relatively brittle and easily broken or a liquid. Through the structure in which the thermoplastic resin (C) is contained at the outer side of the composite (F), the thermoplastic resin (C) having a high molecular weight protects the composite (F), preventing destruction and scattering of the compound (D) due to the impact or abrasion during conveyance and handling of the molding material, and the shape of the molding material can be retained. The molding material, from the standpoint of handleability, preferably keeps the above-described shape until being subjected to molding.

The composite (F) and the thermoplastic resin (C) may be such that the composite (F) and the thermoplastic resin (C) which has partially penetrated into a portion of the composite (F) at or near their interface are mixing with each other, or that the fiber bundle (E) is impregnated with the thermoplastic resin (C).

Figure 3:
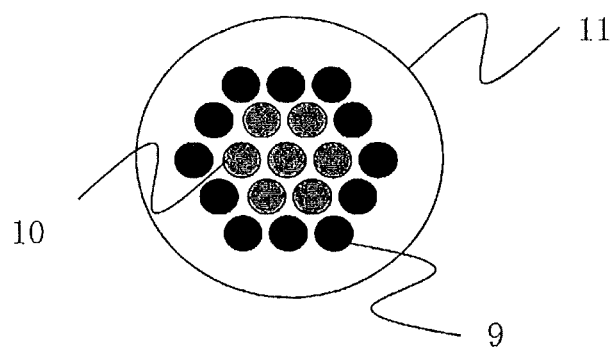
FIG. 3 is a schematic view illustrating a molding material cross-section in an example where the carbon fibers (A) envelop the organic fibers (B) in a cross-section of the fiber bundle (E).
Figure 4:
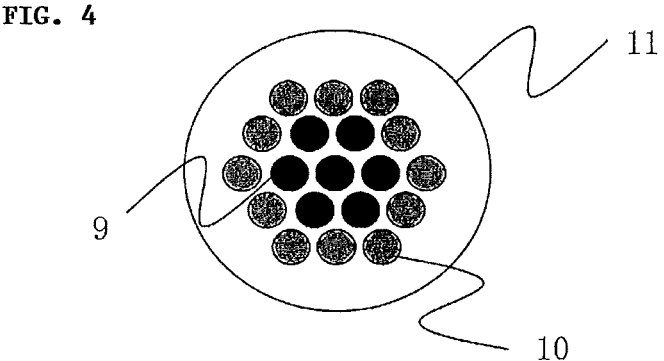
FIG. 4 is a schematic view illustrating a molding material cross-section in an example where the organic fibers (B) envelop the carbon fibers (A) in a cross-section of the fiber bundle (E).
Figure 5:
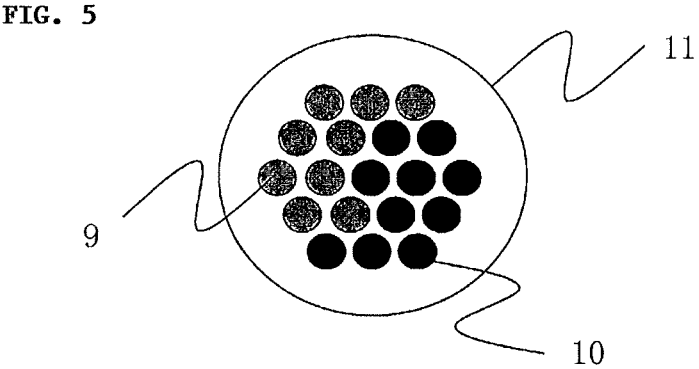
FIG. 5 is a schematic view illustrating a molding material cross-section in an example where a bundle of the carbon fibers (A) and a bundle of the organic fibers (B) are present separated by a certain boundary in a cross-section of the fiber bundle (E).

In the molding material according to the first configuration, the carbon fibers (A) and the organic fibers (B) are preferably unevenly distributed in a cross section of the fiber bundle (E). The cross-section of the fiber bundle (E) refers to a cross-section of the fiber bundle (E) perpendicular to the longer direction of fiber. Uneven distribution of the carbon fibers (A) and the organic fibers (B) in a cross section of the fiber bundle (E) can prevent entanglement between the carbon fibers (A) and the organic fibers (B) during molding to provide a molded article in which the carbon fibers (A) and the organic fibers (B) are uniformly dispersed. Consequently, the mechanical properties, particularly, impact strength and low-temperature impact strength of the molded article can be significantly improved. "Uneven distribution" herein means that in a cross section of the fiber bundle (E), the carbon fibers (A) and the organic fibers (B) are not present uniformly throughout the region but present unevenly at some parts. Examples of "uneven distribution" include what is called "core-in-sheath" structures such as an example where the carbon fibers (A) envelop the organic fibers (B) in a cross section of the fiber bundle (E), as shown in FIG. 3, and an example where the organic fibers (B) envelop the carbon fibers (A), as shown in FIG. 4, and a structure in which a bundle of the carbon fibers (A) and a bundle of the organic fibers (B) are present separated by a certain boundary in a cross section of the fiber bundle (E), as shown in FIG. 5. "Envelop" herein refers to a state in which the carbon fibers (A) are disposed at the core and the organic fibers (B) at the sheath, or a state in which the organic fibers (B) are disposed at the core and the carbon fibers (A) at the sheath. In the example shown in FIG. 5, at least a portion of the carbon fibers (A) and at least a portion of the organic fibers (B) are both in contact with the thermoplastic resin (C) at the outer side in a cross section of the fiber bundle (E). In this case, examples where the carbon fibers (A) or the organic fibers (B) are in contact with the thermoplastic resin (C) includes examples where the carbon fibers (A) or the organic fibers (B) are in contact with the thermoplastic resin (C) via the compound (D).

To confirm that the carbon fibers (A) and the organic fibers (B) are unevenly distributed in a cross section of the fiber bundle (E), for example, a method can be used in which a cross-section perpendicular to the longer direction of fiber of the molding material is observed under a light microscope at a magnification of 300×, and the micrograph obtained is subjected to image processing and analyzed.

In the molding material according to the first configuration, the length of the fiber bundle (E) is preferably substantially the same as the length of the molding material. When the length of the fiber bundle (E) is substantially the same as the length of the molding material, the lengths of the carbon fibers (A) and the organic fibers (B) in the molded article can be long, which can provide more excellent mechanical properties. The length of the molding material is a length of the orientation direction of the fiber bundle (E) in the molding material. "Substantially the same length" means that the fiber bundle (E) is not cut intentionally in the molding material or the fiber bundle (E) significantly shorter than the overall length of the molding material is substantially absent. Although the amount of the fiber bundle (E) shorter than the overall length of the molding material is not limited to a particular value, the amount of the fiber bundle (E) having a length that is 50% or less of the overall length of the molding material is preferably 30% by mass or less of the total amount of the fiber bundle (E), more preferably 20% by mass or less. The molding material is preferably continuous and has a cross-sectional shape that is substantially the same across the length.

The length of the molding material according to the first configuration is typically 3 mm to 15 mm.

As the components (A) to (D) of the molding material according to the first configuration, (A) to (D) previously described with respect to the molded article can be used. In addition, the other components exemplified for the molded article may be contained.

The molding material according to the first configuration preferably contains the carbon fibers (A) in an amount of 5 to 45 parts by weight based on 100 parts by weight of the total amount of the carbon fibers (A), the organic fibers (B), the thermoplastic resin (C), and the compound (D). To further improve the mechanical properties, particularly, flexural properties and impact strength of the molded article, the amount of the carbon fibers (A) is more preferably 10 parts by weight or more. To improve the dispersibility of the carbon fibers (A) in the molded article and further improve the mechanical properties, particularly, impact strength of the molded article, the amount of the carbon fibers (A) is more preferably 30 parts by weight or less. The molding material according to the first configuration preferably contains the organic fibers (B) in an amount of 1 to 45 parts by weight based on 100 parts by weight of the total amount of (A) to (D). To further improve the mechanical properties, particularly, impact properties and low-temperature impact properties of the molded article, the amount of the organic fibers (B) is preferably 5 parts by weight or more. To improve the dispersibility of the organic fibers (B) in the molded article and further improve the mechanical properties, particularly, impact strength of the molded article, the amount of the organic fibers (B) is more preferably 30 parts by weight or less. Furthermore, the molding material according to the first configuration preferably contains the thermoplastic resin (C) in an amount of 20 to 93 parts by weight and the compound (D) in an amount of 1 to 20 parts by weight based on 100 parts by weight of the total amount of (A) to (D). To improve the flowability and dispersibility of the carbon fibers (A) and the organic fibers (B) during molding, the amount of the compound (D) is more preferably 2 parts by weight or more, still more preferably 4 parts by weight or more. To further improve the mechanical properties, particularly, flexural strength, tensile strength, and impact strength of the molded article, the amount of the compound (D) is more preferably 15 parts by weight or less, still more preferably 12 parts by weight or less, and yet more preferably 10 parts by weight or less.

Next, the molding material according to the second configuration will be described. The molding material according to the second configuration used to produce the molded article described above preferably comprises a carbon fiber reinforced thermoplastic resin molding material (X) (also referred to as "carbon fiber reinforced molding material") comprising at least carbon fibers (A), a thermoplastic resin (C), and a compound (D) having a melt viscosity at 200° C. that is lower than that of the thermoplastic resin (C), and an organic fiber reinforced thermoplastic resin molding material (Y) (also referred to as "organic fiber reinforced molding material") comprising at least organic fibers (B), a thermoplastic resin (G), and a compound (H) having a melt viscosity at 200° C. that is lower than that of the thermoplastic resin (H) (also referred to as "compound (H)"). The carbon fiber reinforced molding material (X) preferably has a structure comprising a composite (F) obtained by impregnating the carbon fibers (A) with the compound (D), the thermoplastic resin (C) being contained at the outer side of the composite (F). The organic fiber reinforced molding material (Y) preferably has a structure comprising a composite (I) obtained by impregnating the organic fibers (B) with the compound (H), the thermoplastic resin (G) being contained at the outer side of the composite (I).

The combination of the carbon fiber reinforced molding material (X) comprising the carbon fibers (A), which are rigid, brittle, less prone to entanglement, and prone to breakage and the organic fiber reinforced molding material (Y) comprising the organic fibers (B) can serve as a reinforcement material to provide the molded article with higher impact strength and higher low-temperature impact strength. This effect was as described above with respect to the molded article. The thermoplastic resin (C) and the thermoplastic resin (G), which are matrix resins having relatively high viscosity and excellent physical properties such as toughness, are impregnated into the carbon fibers (A) or the organic fibers (B) during molding to firmly hold the carbon fibers (A) or the organic fibers (B) in the molded article. The thermoplastic resin (C) and the thermoplastic resin (G) may be of the same type. The compound (D) and the compound (H) each form a composite together with the carbon fibers (A) or the organic fibers (B), and assist a matrix resin (the thermoplastic resin (C) or (G)) to impregnate into the carbon fibers (A) or the organic fibers (B) during molding and assist the carbon fibers (A) or the organic fibers (B) to disperse in the matrix resin (the thermoplastic resin (C) or (G)), i.e., act as what is called an impregnation aid and a dispersion aid. The compound (D) and the compound (H) may be of the same type.

The carbon fiber reinforced molding material (X) preferably has the composite (F) including the thermoplastic resin (C) in which gaps between single fibers of the carbon fibers (A) in the form of a continuous fiber bundle are filled with the compound (D). The composite (F) preferably has a structure in which the carbon fibers (A) are dispersed like islands in a sea of the compound (D). Similarly, the organic fiber reinforced molding material (Y) preferably has the composite (I) in which gaps between single fibers of the organic fibers (B) are filled with the compound (H) and has a structure in which the organic fibers (B) are dispersed like islands in a sea of the compound (H).

The carbon fiber reinforced molding material (X) in the molding material according to the second configuration preferably comprises the thermoplastic resin (C) at the outer side of the composite (F) obtained by impregnating the carbon fibers (A) with the compound (D). A structure is preferred in which the thermoplastic resin (C) is disposed surrounding the composite (F) in a cross-section perpendicular to the longer direction of the carbon fiber reinforced molding material (X), or the composite (F) and the thermoplastic resin (C) are disposed in layers, the thermoplastic resin (C) being the outermost layer. Similarly, the organic fiber reinforced molding material (Y) preferably comprises the thermoplastic resin (G) at the outer side of the composite (I) obtained by impregnating the organic fibers (B) with the compound (H). A structure is preferred in which the thermoplastic resin (G) is disposed surrounding the composite (I) in a cross-section perpendicular to the longer direction of the organic fiber reinforced molding material (Y), or the composite (I) and the thermoplastic resin (G) are disposed in layers, the thermoplastic resin (G) being the outermost layer.

In the molding material according to the second configuration, the compound (D) and the compound (H) in most cases are of low molecular weight, and at normal temperature, they are typically solids that are relatively brittle and easily broken or liquids. In the carbon fiber reinforced molding material (X) and the organic fiber reinforced molding material (Y), through the structure in which the thermoplastic resin (C) or (G) is contained at the outer side of the composite (F) or the composite (I), the thermoplastic resin (C) or (G) having a high molecular weight protects the composite (F) or the composite (I), preventing destruction and scattering of the compound (D) or (H) due to the impact or abrasion during conveyance and handling of the molding material, and the shape of the molding material can be retained. The molding material according to the second configuration preferably keeps the above-described shape until being subjected to molding.

In the carbon fiber reinforced molding material (X), the composite (F) and the thermoplastic resin (C) may be such that the composite (F) and the thermoplastic resin (C) which has partially penetrated into a portion of the composite (F) at or near their interface are mixing with each other, or that the carbon fibers (A) are impregnated with the thermoplastic resin (C). Similarly, in the organic fiber reinforced molding material (Y), the composite (I) and the thermoplastic resin (G) may be such that the composite (I) and the thermoplastic resin (G) which has partially penetrated into a portion of the composite (I) at or near their interface are mixing with each other, or that the organic fibers (B) are impregnated with the thermoplastic resin (G).

The organic fiber reinforced molding material (Y) comprises the organic fibers (B), the thermoplastic resin (G), and the compound (H), and may be a pellet obtained by melt-kneading these components. The organic fiber reinforced molding material (Y) obtained by melt-kneading comprises the thermoplastic resin (G) at the outer side of the composite (I) obtained by impregnating the organic fibers (B) with the compound (H). In this case, the composite (I) may be uniformly dispersed in the thermoplastic resin (G). Alternatively, the composite (I) and the thermoplastic resin (G) may be such that the composite (I) and the thermoplastic resin (G) which has partially penetrated into a portion of the composite (I) at or near their interface are mixing with each other, or that the organic fibers (B) are impregnated with the thermoplastic resin (G).

In the molding material according to the second configuration, the average fiber length of the organic fibers (B) in the organic fiber reinforced molding material (Y) is preferably in the range of 0.1 mm to 10 mm. When the average fiber length of the organic fibers (B) is in this range, the fiber length of the organic fibers (B) in the molded article can be long, which can further improve the impact strength and low-temperature impact strength of the molded article. The range of 1.5 mm to 10 mm is more preferred.

The carbon fibers (A) in the carbon fiber reinforced molding material (X) preferably has a length that is substantially the same as the length of the carbon fiber reinforced molding material (X). When the length of the carbon fibers (A) is substantially the same as the length of the carbon fiber reinforced molding material (X), the length of the carbon fibers (A) in the molded article can be long, which can provide excellent mechanical properties. The length of the carbon fiber reinforced molding material (X) is a length of the orientation direction of the carbon fibers (A) in the carbon fiber reinforced molding material. "Substantially the same length" means that the carbon fibers (A) are not cut intentionally in the molding material or the carbon fibers (A) significantly shorter than the overall length of the molding material are substantially absent. Although the amount of the carbon fibers (A) shorter than the overall length of the molding material is not limited to a particular value, the amount of the carbon fibers (A) having a length that is 50% or less of the overall length of the molding material is preferably 30% by mass or less of the total amount of the carbon fibers (A), more preferably 20% by mass or less. The molding material is preferably, but not necessarily, continuous and has a cross-sectional shape that is substantially the same across the length. The length of the carbon fiber reinforced molding material (X) is typically in the range of 3 mm to 15 mm.

The organic fibers (B) in the organic fiber reinforced molding material (Y) preferably has a length that is substantially the same as the length of the organic fiber reinforced molding material (Y). When the length of the organic fibers (B) is substantially the same as the length of the organic fiber reinforced molding material (Y), the length of the organic fibers (B) in the molded article can be long, which can provide excellent mechanical properties. The length of the organic fiber reinforced molding material (Y) is a length of the orientation direction of the organic fibers (B) in the organic fiber reinforced molding material. "Substantially the same length" means that the organic fibers (B) are not cut intentionally in the molding material or the organic fibers (B) significantly shorter than the overall length of the molding material are substantially absent. More specifically, it means that the distance between two longitudinal edges of the organic fibers (B) in the organic fiber reinforced molding material (Y) is the same as the longitudinal length of the organic fiber reinforced molding material (Y), and the amount of the organic fibers (B) having a length that is 50% or less of the overall length of the molding material is preferably 30% by mass or less of the total amount of organic fibers (B), more preferably 20% by mass or less. The molding material is preferably, but not necessarily, continuous and has a cross-sectional shape that is substantially the same across the length. The length of the organic fiber reinforced molding material (Y) is typically 3 mm to 15 mm.

"Average fiber length" in the molding material can be determined similarly to the average fiber length in the molded article.

As the components (A) to (D) of the molding material according to the second configuration, (A) to (D) previously described with respect to the molded article can be used. As (G) and (H), (C) and (D) previously described with respect to the molded article can be used, respecttively. In addition, the other components exemplified for the molded article may be contained.

In the molding material according to the second configuration, the carbon fiber reinforced molding material (X) preferably contains the carbon fibers (A) in an amount of 5 to 45 parts by weight based on 100 parts by weight of the total amount of the carbon fibers (A), the thermoplastic resin (C), and the compound (D). To further improve the mechanical properties, particularly, flexural properties and impact strength of the molded article, the amount of the carbon fibers (A) is more preferably 10 parts by weight or more. To improve the dispersibility of the carbon fibers (A) in the molded article and further improve the mechanical properties, particularly, impact strength of the molded article, the amount of the carbon fibers (A) is more preferably 30 parts by weight or less. The carbon fiber reinforced molding material (X) preferably contains the thermoplastic resin (C) in an amount of 35 to 94 parts by weight and the compound (D) in an amount of 1 to 20 parts by weight. To improve the flowability and dispersibility of the carbon fibers (A) and the organic fibers (B) during molding, the amount of the compound (D) is more preferably 2 parts by weight or more, still more preferably 4 parts by weight or more. To further improve the mechanical properties, particularly, flexural strength, tensile strength, and impact strength of the molded article, the amount of the compound (D) is more preferably 15 parts by weight or less, still more preferably 12 parts by weight or less, and yet more preferably 10 parts by weight or less.

The organic fiber reinforced molding material (Y) preferably contains the organic fibers (B) in an amount of 1 to 45 parts by weight based on 100 parts by weight of the total amount of the organic fibers (B), the thermoplastic resin (G), and the compound (H). To further improve the mechanical properties, particularly, impact properties and low-temperature impact properties of the molded article, the amount of the organic fibers (B) is preferably 5 parts by weight or more. To improve the dispersibility of the organic fibers (B) in the molded article and further improve the mechanical properties, particularly, impact strength of the molded article, the amount of the organic fibers (B) is more preferably 30 parts by weight or less. The organic fiber reinforced molding material (Y) preferably contains the thermoplastic resin (G) in an amount of 35 to 94 parts by weight and the compound (H) in an amount of 1 to 20 parts by weight. To improve the flowability and dispersibility of the carbon fibers (A) and the organic fibers (B) during molding, the amount of the compound (H) is more preferably 2 parts by weight or more, still more preferably 4 parts by weight or more. To further improve the mechanical properties, particularly, flexural strength, tensile strength, and impact strength of the molded article, the amount of the compound (H) is more preferably 15 parts by weight or less, still more preferably 12 parts by weight or less, and yet more preferably 10 parts by weight or less.

The carbon fiber reinforced molding material (X) in the molding material according to the second configuration can be obtained, for example, by the following method. First, a roving of carbon fibers (A) is aligned in the longer direction of fiber, and then the carbon fiber bundle is impregnated with a molten compound (D) to prepare a composite (F). The composite (F) is guided to an impregnation die filled with a molten thermoplastic resin (C) to coat the outer surface of the composite (F) with the thermoplastic resin (C), and pultruded through a nozzle. The pultruded product is cooled and solidified, and then pelletized to a predetermined length to obtain a molding material. The thermoplastic resin (C) may be impregnated into the carbon fiber bundle as long as it is contained at the outer side of the composite (F). The organic fiber reinforced molding material (Y) in the second molding material is produced, for example, by the same method as that used for the carbon fiber reinforced molding material (X), or, alternatively, by the following method, for example. First, an organic fiber bundle is impregnated with a molten compound (H) to prepare a composite (I); the composite (I) is melt-kneaded together with a thermoplastic resin (G) in a single- or twin-screw extruder and discharged through a die tip into a strand; and the strand is cooled and solidified, and then pelletized to a predetermined length to obtain a molding material.

Mixing the carbon fiber reinforced molding material (X) and the organic fiber reinforced molding material (Y) in the molding material according to the second configuration by dry-blending and molding the resulting mixture can provide a fiber reinforced thermoplastic resin molded article excellent in dispersibility of the carbon fibers (A) and the organic fibers (B), impact strength, and low-temperature impact strength. For the mixing ratio of the carbon fiber reinforced molding material (X) to the organic fiber reinforced molding material (Y), the carbon fiber reinforced molding material (X) and the organic fiber reinforced molding material (Y) are preferably contained in an amount of 50 to 80 parts by weight and 20 to 50 parts by weight, respectively, based on 100 parts by weight of the total amount of the carbon fiber reinforced molding material (X) and the organic fiber reinforced molding material (Y). In addition, using the organic fiber reinforced molding material (Y) produced by melt-kneading can provide a fiber reinforced thermoplastic resin molded article with higher productivity. A preferred molding method is molding using a die, and various known methods such as injection molding, extrusion molding, and press molding can be used. In particular, molding using an injection molding machine can continuously provide stable molded articles.

The molded article is a fiber reinforced thermoplastic resin molded article excellent in falling weight impact strength, impact strength, and low-temperature impact strength, and the molded article is advantageously used, for example, for automotive parts such as instrument panels, door beams, underside covers, lamp housings, pedal housings, radiator supports, spare tire covers, and various modules at a front end and the like; parts of home and office appliances such as telephones, facsimiles, VTRs, copying machines, televisions, microwave ovens, audio equipment, toiletry goods, "Laser Disc (registered trademark)," refrigerators, and airconditioners; and parts of electrical and electronic equipment represented by housings used for personal computers and cellular phones and keyboard supports for supporting a keyboard in a personal computer.

EXAMPLES

Our articles, materials and methods will now be described in more detail with reference to examples, but these examples are not intended to limit this disclosure. First, methods of evaluating various properties used in the examples will be described.

(1) Measurement of Melt Viscosity

For each of the thermoplastic resins (C) and (G) and the compounds (D) and (H) used in Examples and Comparative Examples, a melt viscosity at 200° C. was measured with a viscoelasticity meter at 0.5 Hz using a 40-mm parallel plate.

The compounds (D) and (H) were each allowed to stand in a hot-air dryer at 200° C. for 2 hours, and then a melt viscosity at 200° C. was measured in a similar manner. The compounds (D) and (H) were each allowed to stand in a hot-air dryer at 200° C. for 2 hours, and then a melt viscosity at 200° C. was measured in a similar manner.

(2) Measurement of Average Fiber Length and Average Straight-Line Distance Between Two Edges of Single Fiber A molded article sandwiched between glass plates was heated on a hot stage set at 300° C. and uniformly dispersed in the form of a film. The film in which the carbon fibers (A) or the organic fibers (B) were uniformly dispersed was observed under a light microscope (50 to 200×). For both of randomly-selected 1,000 carbon fibers (A) and randomly-selected 1,000 organic fibers (B), fiber lengths and straight-line distances between two edges of a single fiber were measured, and an average fiber length and an average straight-line distance between two edges of a single fiber were calculated by the following equations:

Average fiber length=$\Sigma(Mi^2 \times Ni)/\Sigma(Mi \times Ni)$

Mi: fiber length (mm)
Ni: number of fibers having a fiber length Mi

Average straight-line distance between two edges of a single fiber=$\Sigma(Mi'^2 \times Ni')/(Mi' \times Ni')$ Mi': straight-line distance between two edges of a single fiber (mm)
Ni': number of fibers having a straight-line distance between two edges of a single fiber Mi'.

(3) Measurement of Tensile Break Elongation

The tensile break elongation (%) of the organic fibers (B) was measured as follows: a tensile test was carried out in a room under standard conditions (20° C., 65% RH) at a chuck distance of 250 mm and a tensile speed of 300 mm/min, and a length at fiber break was measured (breakages in the vicinity of chucks were considered as a chucking breakage and excluded from a data), calculated to the second decimal place by the following equation, and rounded to one decimal place. For each of the organic fibers (B), an average value of three data was determined and defined as the tensile break elongation.

Tensile break elongation (%)=[(length at break (mm)−250)/250]×100

(4) Measurement of Flexural Strength of Molded Article

For each of the ISO dumbbell specimens obtained in Examples and Comparative Examples, a flexural strength was measured in accordance with ISO 178 using a β-point bend fixture (indenter radius: 5 mm) at a fulcrum distance of 64 mm under test conditions of a testing speed of 2 mm/min. INSTRON (registered trademark) universal tester model 5566 (manufactured by Instron) was used as a tester.

(5) Measurement of Charpy Impact Strength of Molded Article

A parallel portion of ISO dumbbell specimens obtained in Examples and Comparative Examples was cut out, and a V-notch Charpy impact test was performed in accordance with ISO179 using a C1-4-01 model tester manufactured by Tokyo Testing Machine Inc. to calculate an impact strength (kJ/cm$^2$).

(6) Measurement of Falling Weight Impact Strength of Molded Article

For each of the specimens of 80 mm×80 mm×2 mm obtained in Examples and Comparative Examples, a falling weight impact test was carried out using a weight with a round tup at its tip at a weight of 5.1356 kg, a falling speed of 0.5 m/sec, and a test temperature of 23° C. to measure a falling weight impact strength (kJ/cm$^2$). Furthermore, a falling weight impact test was carried out in the same manner at a test temperature of −20° C. to measure a falling weight impact strength (kJ/cm$^2$).

(7) Evaluation of Fiber Broken-Out Section of Molded Article after Impact Test

After the Charpy impact test was performed by the method described in (5), a portion of a broken specimen including a cross-section was cut to a size of 10 mm×10 mm×2 mm, and a cross-sectional image of the broken specimen was taken using InTouchScope JSM-6010LA manufactured by JEOL Ltd. at a magnification of 2,000×. The micrograph obtained was subjected to image processing and analyzed.

(8) Evaluation of Productivity of Molding Material

A production volume of the organic fiber reinforced molding material (Y) per hour was determined. Production volumes of 10 kg/hr or more were ranked A, and production volumes of less than 10 kg/hr were ranked B.

(9) Evaluation of Fiber Dispersibility of Molded Article Obtained Using Molding Material For each of the specimens of 80 mm×80 mm×2 mm obtained in Examples and Comparative Examples, the number of undispersed carbon fiber bundles existing on the front side and the back side was visually counted. Using the total sum of the number of undispersed carbon fiber bundles on 50 molded articles, the fiber dispersibility was evaluated according to the following criteria, and A and B were regarded as acceptable:

A: No undispersed carbon fiber bundle
B: 1 to 4 undispersed carbon fiber bundles
C: 5 to 9 undispersed carbon fiber bundles
D: 10 or more undispersed carbon fiber bundles.

Reference Example 1

Preparation of Carbon Fibers (A)

Using a copolymer composed mainly of polyacrylonitrile, spinning, firing, and surface oxidation were performed to obtain continuous carbon fibers with a total fiber count of 24,000, a single fiber diameter of 7 μm, a mass per unit length of 1.6 g/m, a specific gravity of 1.8 g/cm$^3$, and a surface oxygen concentration ratio [O/C] of 0.2. These continuous carbon fibers had a strand tensile strength of 4,880 MPa and a strand tensile modulus of 225 GPa. Subsequently, a mother liquor of a sizing agent was prepared by dissolving polyglycerol polyglycidyl ether, a polyfunctional compound, in water to 2% by weight, and the sizing agent was applied to the carbon fibers by the dipping method and dried at 230° C. The amount of sizing agent deposited on the carbon fibers thus obtained was 1.0% by weight.

Reference Example 2

Organic Fibers (B)

Polyphenylene sulfide fibers ("TORCON" (registered trademark) 400T-100-190 available from Toray Industries, Inc., single fiber fineness: 4.0 dtex, melting point: 285° C.) were used. The elongation at break of the fibers was measured by the method described in (3) above to be 30%.

Polyester fibers ("TETORON" (registered trademark) 2200T-480-705M available from Toray Industries, Inc., single fiber fineness: 4.6 dtex, melting point: 260° C.) were used. Similar to the above polyphenylene sulfide fibers, the elongation at break was measured by the method described in (3) above to be 15%.

Polytetrafluoroethylene fibers ("TOYOFLON" (registered trademark) 440T-60ES290-M190 available from Toray Industries, Inc., single fiber fineness: 7.3 dtex, melting point: 327° C.) were used. Similar to the above polyphenylene sulfide fibers, the elongation at break was measured by the method described in (3) above to be 25%.

Reference Example 3

Thermoplastic Resins (C) and (G)

A pellet blend of a polypropylene resin ("Prime Polypro" (registered trademark) J137 available from Prime Polymer Co., Ltd.) and a maleic acid-modified polypropylene resin ("ADMER" (registered trademark) QE840 available from Mitsui Chemicals, Inc.) (PP) at a weight ratio of 85/15 was used. The melt viscosity at 200° C. was measured by the method described in (1) above to be 50 Pas.

A polycarbonate resin ("Panlite" (registered trademark) L-1225L available from Idemitsu Kosan Co., Ltd.) (PC) was used. Similar to the above polypropylene resin, the melt viscosity at 200° C. was measured by the method described in (1) above to be 14,000 Pas.

Reference Example 4

Compounds (D) and (H)

A solid hydrogenated terpene resin (CLEARON (registered trademark) P125 available from Yasuhara Chemical Co., Ltd., softening point: 125° C.) was used. This was introduced into a tank in an impregnation aid applicator. The temperature in the tank was set at 200° C., and the resin was heated for 1 hour to a molten state. The melt viscosity of 200° C. at this time was measured by the method described in (1) above to be 1 Pa·s, and the rate of change of melt viscosity was calculated to be 1.2%.

When a polycarbonate resin was used as a thermoplastic resin (C), a solid bisphenol A epoxy resin (jER1004AF available from Mitsubishi Chemical Corporation, softening point: 97° C.) was used as a compound (D). Similar to the above P125, the melt viscosity was measured by the method described in (1) above to be 1 Pa·s, and the rate of change of melt viscosity was calculated to be 1.1%.

Production Example 1

Carbon Fiber Reinforced Thermoplastic Resin Molding Material (X-1)

A composite (F) obtained by impregnating a bundle of the carbon fibers (A) described above with the compound (D) at the ratio shown in Table 1 was fed into a coating die for wire coating mounted at the end of a TEX-30α model twin-screw extruder (screw diameter: 30 mm, L/D=32) manufactured by Japan Steel Works, LTD. Meanwhile, the thermoplastic resin (C) shown in Table 1 was supplied from a main hopper of the TEX-30α model twin-screw extruder and melt-kneaded at a screw speed of 200 rpm. The molten thermoplastic resin (C) was discharged from the twin-screw extruder into the die, such that the molten thermoplastic resin (C) was disposed continuously surrounding the composite (F). The strand obtained was cooled and then cut with a cutter into pellets with a length of 7 mm to provide long-fiber pellets (X-1) in which the length of the bundle of the carbon fibers (A) and the length of the molding material are substantially the same. In this process, the take-up speed of the bundle of the carbon fibers (A) was adjusted such that the amount of the carbon fibers (A) was 30 parts by weight based on 100 parts by weight of the total amount of (A), (C), and (D).

Production Example 2

Carbon Fiber Reinforced Thermoplastic Resin Molding Material (X-2)

A bundle of the carbon fibers (A) described above was fed into a coating die for wire coating mounted at the end of a TEX-30α model twin-screw extruder (screw diameter: 30 mm, L/D=32) manufactured by Japan Steel Works, LTD. at the ratio shown in Table 1. Meanwhile, the thermoplastic resin (C) shown in Table 1 was supplied from a main hopper of the TEX-30α model twin-screw extruder and melt-kneaded at a screw speed of 200 rpm. The molten thermoplastic resin (C) was discharged from the twin-screw extruder into the die, such that the molten thermoplastic resin (C) was disposed continuously surrounding the bundle of the carbon fibers (A). The strand obtained was cooled and then cut with a cutter into pellets with a length of 7 mm to provide long-fiber pellets (X-2) in which the length of the bundle of the carbon fibers (A) and the length of the molding material are substantially the same. In this process, the take-up speed of the bundle of the carbon fibers (A) was adjusted such that the amount of the carbon fibers (A) was 40 parts by weight based on 100 parts by weight of the total amount of (A) and (C).

Production Example 3

Organic Fiber Reinforced Thermoplastic Resin Molding Material (Y-1)

A composite (I) obtained by impregnating a bundle of the organic fibers (B) described above with the compound (H) at the ratio shown in Table 1 was fed into a coating die for wire coating mounted at the end of a TEX-30α model twin-screw extruder (screw diameter: 30 mm, L/D=32) manufactured by Japan Steel Works, LTD. Meanwhile, the thermoplastic resin (G) shown in Table 1 was supplied from a main hopper of the TEX-30α model twin-screw extruder and melt-kneaded at a screw speed of 200 rpm. The molten thermoplastic resin (G) was discharged from the twin-screw extruder into the die, such that the molten thermoplastic resin (G) was disposed continuously surrounding the composite (I). The strand obtained was cooled and then cut with a cutter into pellets with a length of 7 mm to provide long-fiber pellets (Y-1) in which the length of the bundle of the organic fibers (B) and the length of the molding material are substantially the same. In this process, the take-up speed of the bundle of the organic fibers (B) was adjusted such that the amount of the organic fibers (B) was 30 parts by weight based on 100 parts by weight of the total amount of (B), (G), and (H).

Production Example 4

Organic Fiber Reinforced Thermoplastic Resin Molding Material (Y-2)

Long-fiber pellets (Y-2) were prepared in the same manner as in Production Example 3 above. In this process, the take-up speed of the bundle of the organic fibers (B) was adjusted such that the amount of the organic fibers (B) was 40 parts by weight based on 100 parts by weight of the total amount of (B), (G), and (H).

Production Example 5

Organic Fiber Reinforced Thermoplastic Resin Molding Material (Y-3)

Long-fiber pellets (Y-3) were prepared in the same manner as in Production Example 3 above. In this process, the take-up speed of the bundle of the organic fibers (E) was adjusted such that the amount of the organic fibers (E) was 50 parts by weight based on 100 parts by weight of the total amount of (B), (G), and (H).

Production Example 6

Organic Fiber Reinforced Thermoplastic Resin Molding Material (Y-4)

A composite (I) obtained by impregnating a bundle of the organic fibers (B) described above with the compound (H) at the ratio shown in Table 1 was melt-kneaded in a cylinder at a screw speed of 200 rpm together with the thermoplastic resin (G) molten in a TEX-30α model twin-screw extruder (screw diameter: 30 mm, L/D=32) manufactured by Japan Steel Works, LTD. The strand discharged through a die tip was cooled and solidified, and then cut with a cutter into pellets with a length of 7 mm to prepare pellets (Y-4). In this process, the take-up speed of the bundle of the organic fibers (B) was adjusted such that the amount of the organic fibers (B) was 30 parts by weight based on 100 parts by weight of the total amount of (B), (G), and (H).

Example 1

Using equipment for producing long-fiber reinforced resin pellets, the equipment including a coating die for wire coating mounted at the end of a TEX-30α model twin-screw extruder (screw diameter: 30 mm, L/D=32) manufactured by Japan Steel Works, LTD., the extruder cylinder temperature was set at 220° C., and the thermoplastic resin (C) shown in Table 2 was supplied from a main hopper and melt-kneaded at a screw speed of 200 rpm. While adjusting the discharge rate to be 8 parts by weight based on 100 parts by weight of the total amount of (A) to (C), the compound (D) melted by heating at 200° C. was fed to a die port (3 mm in diameter), from which the molten thermoplastic resin (C) is discharged, to be disposed continuously surrounding a fiber bundle (E) composed of the carbon fibers (A) and the organic fibers (B). In an internal cross-section of the fiber bundle (E) at this time, the carbon fibers (A) and the organic fibers (B) were unevenly distributed. They were unevenly distributed such that at least a portion of the carbon fibers (A) and at least a portion of the organic fibers (B) were in contact with the thermoplastic resin (C). The strand obtained was cooled and then cut with a cutter into pellets with a length of 7 mm to provide long-fiber pellets. In this process, the take-up speed was adjusted such that the amount of the carbon fibers (A) was 20 parts by weight, and the amount of the organic fibers (B) was 10 parts by weight based on 100 parts by weight of the total amount of (A) to (C).

The long-fiber pellets thus obtained were injection molded using an injection molding machine J110AD manufactured by Japan Steel Works, LTD. at an injection time of 5 seconds, a back pressure of 5 MPa, a holding pressure of 20 MPa, a pressure holding time of 10 seconds, a cylinder temperature of 230° C., and a mold temperature of 60° C. to prepare an ISO dumbbell specimen and a specimen of 80 mm×80 mm×2 mm in the form of a molded article. The cylinder temperature refers to a temperature of a portion to heat and melt a molding material in the injection molding machine, and the mold temperature refers to a temperature of a die into which a resin is injected for a desired shape. The specimens (molded articles) obtained were allowed to stand in a constant temperature and humidity room conditioned at 23° C. and 50% RH for 24 hours, and then their properties were evaluated. The results of evaluation according to the methods described above are summarized in Table 2.

Example 2

Molded articles were prepared and evaluated in the same manner as in Example 1 except that the amounts of the carbon fibers (A), the organic fibers (B), and the thermoplastic resin (C) were 5 parts by weight, 30 parts by weight, and 65 parts by weight, respectively, based on 100 parts by weight of the total amount of (A) to (C). The evaluation results are summarized in Table 2.

Example 3

Molded articles were prepared and evaluated in the same manner as in Example 1 except that the back pressure in injection molding was 10 MPa. The evaluation results are summarized in Table 2.

Example 4

Molded articles were prepared and evaluated in the same manner as in Example 1 except that the back pressure in injection molding was 1 MPa. The evaluation results are summarized in Table 2.

Example 5

Molded articles were prepared and evaluated in the same manner as in Example 1 except that the amounts of the carbon fibers (A) and the thermoplastic resin (C) were 7 parts by weight and 83 parts by weight, respectively, based on 100 parts by weight of the total amount of (A) to (C), and the amount of the compound (D) was 4 parts by weight based on 100 parts by weight of the total amount of (A) to (C). The evaluation results are summarized in Table 2.

Example 6

Molded articles were prepared and evaluated in the same manner as in Example 1 except that the amounts of the carbon fibers (A), the organic fibers (B), and the thermoplastic resin (C) were 35 parts by weight, 5 parts by weight, and 60 parts by weight, respectively, based on 100 parts by weight of the total amount of (A) to (C); the amount of the compound (D) was 10 parts by weight based on 100 parts by weight of the total amount of (A) to (C); the holding pressure in injection molding was 40 MPa; the pressure holding time was 15 seconds; and the mold temperature was 23° C. The evaluation results are summarized in Table 2.

Example 7

Molded articles were prepared and evaluated in the same manner as in Example 1 except that the amounts of the organic fibers (B) and the thermoplastic resin (C) were was 5 parts by weight and 75 parts by weight, respectively, based on 100 parts by weight of the total amount of (A) to (C); the holding pressure in injection molding was 10 MPa; the pressure holding time was 1 second; and the mold temperature was 23° C. The evaluation results are summarized in Table 2.

Example 8

Molded articles were prepared and evaluated in the same manner as in Example 1 except that the injection time in injection molding was 1 second, and the mold temperature was 23° C. The evaluation results are summarized in Table 3.

Example 9

Molded articles were prepared and evaluated in the same manner as in Example 1 except that the injection time in injection molding was 1 second; the holding pressure was 10 MPa; the pressure holding time was 3 seconds; and the mold temperature was 23° C. The evaluation results are summarized in Table 3.

Example 10

Molded articles were prepared and evaluated in the same manner as in Example 1 except that the back pressure in injection molding was 3 MPa; the holding pressure was 10 MPa; the pressure holding time was 3 seconds; and the mold temperature was 23° C. The evaluation results are summarized in Table 3.

Example 11

Molded articles were prepared and evaluated in the same manner as in Example 1 except that polyethylene terephthalate fibers were used as the organic fibers (B). The evaluation results are summarized in Table 3.

Example 12

Molded articles were prepared and evaluated in the same manner as in Example 1 except that polytetrafluoroethylene fibers were used as the organic fibers (B); a polycarbonate resin was used as the thermoplastic resin (C); and a bisphenol A epoxy resin was used as the compound (D). The evaluation results are summarized in Table 3.

Example 13

Molded articles were prepared and evaluated in the same manner as in Example 1 except that the amounts of the carbon fibers (A), the organic fibers (B), and the thermoplastic resin (C) were 25 parts by weight, 40 parts by weight, and 35 parts by weight, respectively, based on 100 parts by weight of the total amount of (A) to (C), and the amount of the compound (D) was 0 parts by weight based on 100 parts by weight of the total amount of (A) to (C). The evaluation results are summarized in Table 3.

Example 14

Long-fiber pellets were prepared and evaluated in the same manner as in Example 1 except that the amounts of the carbon fibers (A), the thermoplastic resin (C), and the compound (D) were 10 parts by weight, 74 parts by weight, and 6 parts by weight, respectively, based on 100 parts by weight of the total amount of (A) to (D). The evaluation results are summarized in Table 4.

Example 15

Long-fiber pellets were prepared and evaluated in the same manner as in Example 1 except that the amounts of the carbon fibers (A), the thermoplastic resin (C), and the compound (D) were 30 parts by weight, 50 parts by weight, and 10 parts by weight, respectively, based on 100 parts by weight of the total amount of (A) to (D). The evaluation results are summarized in Table 4.

Example 16

Long-fiber pellets were prepared and evaluated in the same manner as in Example 1 except that the amounts of the organic fibers (B), the thermoplastic resin (C), and the compound (D) were 30 parts by weight, 38 parts by weight, and 12 parts by weight, respectively, based on 100 parts by weight of the total amount of (A) to (D). The evaluation results are summarized in Table 4.

Example 17

Long-fiber pellets were prepared and evaluated in the same manner as in Example 1 except that the carbon fibers (A) and the organic fibers (B) were disposed in the fiber bundle (E) such that the carbon fibers (A) envelop the organic fibers (B). The evaluation results are summarized in Table 4.

Example 18

Long-fiber pellets were prepared and evaluated in the same manner as in Example 1 except that the carbon fibers (A) and the organic fibers (B) were disposed in the fiber bundle (E) such that the organic fibers (B) envelop the carbon fibers (A). The evaluation results are summarized in Table 4.

Example 19

The long-fiber pellets (X-1) obtained in Production Example 1 and the long-fiber pellets (Y-1) obtained in Production Example 3 were dry blended such that the amounts of (X-1) and (Y-1) were 67 parts by weight and 33 parts by weight, respectively, based on 100 parts by weight of the total amount of (X-1) and (Y-1) to prepare a molding material. The molding material obtained was evaluated according to the methods described above. The evaluation results are summarized in Table 5.

Example 20

A molding material was prepared and evaluated in the same manner as in Example 19 except that the long-fiber pellets (X-1) obtained in Production Example 1, the long-fiber pellets (Y-1) obtained in Production Example 3, and pellets of the thermoplastic resin (C) shown in Table 5 were dry blended such that the amounts of (X-1), (Y-1), and (B) were 23 parts by weight, 33 parts by weight, and 44 parts by weight, respectively, based on 100 parts by weight of the total amount of (X-1), (X-2), and (C). The evaluation results are summarized in Table 5.

Example 21

A molding material was prepared and evaluated in the same manner as in Example 19 except that the long-fiber pellets (X-1) obtained in Production Example 1, the long-fiber pellets (Y-2) obtained in Production Example 4, and pellets of the thermoplastic resin (C) shown in Table 5 were dry blended such that the amounts of (X-1), (Y-2), and (C) were 17 parts by weight, 75 parts by weight, and 8 parts by weight, respectively. The evaluation results are summarized in Table 5.

Example 22

A molding material was prepared and evaluated in the same manner as in Example 19 except that the long-fiber pellets (X-2) obtained in Production Example 2 and the long-fiber pellets (Y-2) obtained in Production Example 4 were dry blended such that the amounts of (X-2) and (Y-2)

were 75 parts by weight and 25 parts by weight, respectively, based on 100 parts by weight of the total amount of (X-2) and (Y-2). The evaluation results are summarized in Table 5.

Example 23

A molding material was prepared and evaluated in the same manner as in Example 19 except that the long-fiber pellets (X-1) obtained in Production Example 1, the long-fiber pellets (Y-1) obtained in Production Example 3, and pellets of the thermoplastic resin (C) shown in Table 5 were dry blended such that the amounts of (X-1), (Y-1), and (C) were 67 parts by weight, 17 parts by weight, and 16 parts by weight, respectively, based on 100 parts by weight of the total amount of (X-1), (Y-1), and (C). The evaluation results are summarized in Table 5.

Example 24

A molding material was prepared and evaluated in the same manner as in Example 19 except that the pellets (Y-4) obtained in Production Example 6 were used in place of the long-fiber pellets (Y-1). The evaluation results are summarized in Table 5.

Comparative Example 1

Molded articles were prepared and evaluated in the same manner as in Example 1 except that the amounts of the organic fibers (B) and the thermoplastic resin (C) were 0 parts by weight and 80 parts by weight, respectively, based on 100 parts by weight of the total amount of (A) to (C), and the amount of the compound (D) was 6 parts by weight based on 100 parts by weight of the total amount of (A) to (C). The evaluation results are summarized in Table 6.

Comparative Example 2

Molded articles were prepared and evaluated in the same manner as in Example 1 except that the amounts of the carbon fibers (A) and the thermoplastic resin (C) were 3 parts by weight and 87 parts by weight, respectively, based on 100 parts by weight of the total amount of (A) to (C), and the amount of the compound (D) was 6 parts by weight based on 100 parts by weight of the total amount of (A) to (C). The evaluation results are summarized in Table 6.

Comparative Example 3

Molded articles were prepared and evaluated in the same manner as in Example 1 except that the amounts of the carbon fibers (A) and the thermoplastic resin (C) were 50 parts by weight and 40 parts by weight, respectively, based on 100 parts by weight of the total amount of (A) to (C), and the amount of the compound (D) was 14 parts by weight based on 100 parts by weight of the total amount of (A) to (C). The evaluation results are summarized in Table 6.

Comparative Example 4

Molded articles were prepared and evaluated in the same manner as in Example 1 except that the amounts of the organic fibers (B) and the thermoplastic resin (C) were 50 parts by weight and 30 parts by weight, respectively, based on 100 parts by weight of the total amount of (A) to (C), and the amount of the compound (D) was 16 parts by weight based on 100 parts by weight of the total amount of (A) to (C). The evaluation results are summarized in Table 6.

Comparative Example 5

Molded articles were prepared and evaluated in the same manner as in Example 1 except that the back pressure in injection molding was 13 MPa. The evaluation results are summarized in Table 6.

Comparative Example 6

Molded articles were prepared and evaluated in the same manner as in Example 1 except that the injection time in injection molding was 0.5 seconds, and the back pressure was 11 MPa. The evaluation results are summarized in Table 65.

Comparative Example 7

Molded articles were prepared and evaluated in the same manner as in Example 1 except that the back pressure in injection molding was 12 MPa; the holding pressure was 10 MPa; and the pressure holding time was 3 seconds. The evaluation results are summarized in Table 6.

Comparative Example 8

Long-fiber pellets were prepared and evaluated in the same manner as in Example 1 except that the amounts of the carbon fibers (A) the, organic fibers (B), the thermoplastic resin (C), and the compound (D) were 3 parts by weight, 20 parts by weight, 70 parts by weight, and 7 parts by weight, respectively, based on 100 parts by weight of the total amount of (A) to (D). The evaluation results are summarized in Table 7.

Comparative Example 9

Long-fiber pellets were prepared and evaluated in the same manner as in Example 1 except that the amounts of the carbon fibers (A) the, organic fibers (B), the thermoplastic resin (C), and the compound (D) were 10 parts by weight, 50 parts by weight, 26 parts by weight, and 14 parts by weight, respectively, based on 100 parts by weight of the total amount of (A) to (D). The evaluation results are summarized in Table 7.

Comparative Example 10

Long-fiber pellets were prepared and evaluated in the same manner as in Example 1 except that the carbon fibers (A) and the organic fibers (B) were disposed in an internal cross-section of the fiber bundle (E) in the form that was mixed uniformly. The evaluation results are summarized in Table 7.

Comparative Example 11

A molding material was prepared and evaluated in the same manner as in Example 1 except that the long-fiber pellets (X-1) obtained in Production Example 1 and pellets of the thermoplastic resin (C) shown in Table 8 were dry blended such that the amounts of (X-1) and (C) were 67 parts by weight and 33 parts by weight, respectively, based on 100 parts by weight of the total amount of (X-1) and (C). The evaluation results are summarized in Table 8.

Comparative Example 12

A molding material was prepared and evaluated in the same manner as in Example 1 except that the long-fiber pellets (X-1) obtained in Production Example 1, the long-fiber pellets (Y-3) obtained in Production Example 5, and pellets of the thermoplastic resin (C) shown in Table 5 were dry blended such that, the amounts of (X-1), (Y-3), and (C) were 10 parts by weight, 20 parts by weight, and 70 parts by weight, respectively, based on 100 parts by weight of the total amount of (X-1), (Y-3), and (C). The evaluation results are summarized in Table 8.

The materials of Examples 1 to 12, in the molded articles of which the organic fibers (B) were present in the curved form, all exhibited high impact strength (Charpy impact strength, falling weight impact strength) and high low-temperature impact strength (low-temperature falling weight impact strength). As can be seen from Examples 11 to 12, a similar effect was produced even when organic fibers of different type were used as the organic fibers (B). Furthermore, as can be seen from Example 13, a similar effect was produced without the compound (D).

Also, the materials of Examples 14 to 18 were all excellent in dispersibility of the carbon fibers (A) and the organic fibers (B), and exhibited high impact strength (Charpy impact strength, falling weight impact strength) and high low-temperature impact strength (low-temperature falling weight impact strength). As can be seen from the molding materials of Examples 17 to 18, even when the disposition of the carbon fibers (A) and the organic fibers (B) in the fiber bundle (E) was changed, the dispersibility of the carbon fibers (A) and the organic fibers (B) was excellent, and high impact strength and high low-temperature impact strength were exhibited similarly to Examples 14 to 16.

Also, the materials of Examples 19 to 24 were all excellent in dispersibility of the carbon fibers (A) and the organic fibers (B), and exhibited high impact strength (Charpy impact strength, falling weight impact strength) and high low-temperature impact strength (low-temperature falling weight impact strength). As can be seen from Example 24, when the organic fiber reinforced molding material (Y) was produced by melt-kneading, the dispersibility of the carbon fibers (A) and the organic fibers (B) was excellent, and high impact strength and high low-temperature impact strength were exhibited similarly to Examples 19 to 23, leading to even higher productivity.

On the other hand, in Comparative Example 1, the absence of the organic fibers (B) resulted in a small fiber reinforcing effect, leading to low impact strength and low low-temperature impact strength. In Comparative Example 2, the decreased amount of the carbon fibers (A) resulted in low impact strength and low flexural strength. In Comparative Example 3, the increased amount of the carbon fibers (A) caused ununiform dispersion in the molded article, resulting in low impact strength. In Comparative Example 4, the increased amount of the organic fibers (B) caused increased entanglement between the organic fibers (B), ununiform dispersion in the molded article, and fiber breakage due to increased contact between the fibers, resulting in low impact strength. In Comparative Examples 5 to 6, the short average fiber length of the carbon fibers (A) or the organic fibers (B) resulted in a small fiber reinforcing effect, leading to low impact strength and low low-temperature impact strength. In Comparative Example 7, since the straight-line distance between two edges of a single fiber of the organic fibers (B) was long, and the organic fibers (B) were present linearly, the fiber reinforcing effect at break of the molded article was small, leading to low impact strength and low low-temperature impact strength.

In Comparative Example 8, the decreased amount of the carbon fibers (A) resulted in low impact strength and low flexural strength. In Comparative Example 9, the increased amount of the organic fibers (B) increased the entanglement between the organic fibers (B) and hindered uniform dispersion in the molded article, resulting in low impact strength. In Comparative Example 10, a uniformly mixed disposition of the carbon fibers (A) and the organic fibers (B) in an internal cross-section of the fiber bundle (E) of the molding material caused increased entanglement between fibers in the fiber bundle (E), a short average fiber length of the carbon fibers (A), and ununiform dispersion in the molded article, leading to low impact strength and low low-temperature impact strength.

In Comparative Example 11, the absence of the organic fibers (B) resulted in a small fiber reinforcing effect, leading to low impact strength and low low-temperature impact strength. In Comparative Example 12, the decreased amount of the carbon fibers (A) in the carbon fiber reinforced molding material (X) resulted in low impact strength and low flexural strength.

TABLE 1

| | | | | Manufacturing Example 1 X-1 | Manufacturing Example 2 X-2 | Manufacturing Example 3 Y-1 | Manufacturing Example 4 Y-2 | Manufacturing Example 5 Y-3 | Manufacturing Example 6 Y-4 |
|---|---|---|---|---|---|---|---|---|---|
| Raw materials | Carbon fiber (A) | mixed amount | Parts by weight | 30 | 40 | — | — | — | — |
| | Thermoplastic resin (C) | Type | — | PP | PP | — | — | — | — |
| | | mixed amount | Parts by weight | 62 | 50 | — | — | — | — |
| | Chemical compound (D) | Type | — | Terpene | Terpene | — | — | — | — |
| | | mixed amount | Parts by weight | 8 | 10 | — | — | — | — |
| | Organic fiber (B) | mixed amount | Parts by weight | — | — | 30 | 40 | 50 | 30 |
| | | Organic fiber Type | Type | — | — | PPS | PPS | PPS | PPS |
| | | Tensile fracture elongation | % | — | — | 30 | 30 | 30 | 30 |

TABLE 1-continued

|  |  |  | Manufacturing Example 1 X-1 | Manufacturing Example 2 X-2 | Manufacturing Example 3 Y-1 | Manufacturing Example 4 Y-2 | Manufacturing Example 5 Y-3 | Manufacturing Example 6 Y-4 |
|---|---|---|---|---|---|---|---|---|
| Thermoplastic resin (G) | Type | — | — | — | PP | PP | PP | PP |
|  | mixed amount | Parts by weight | — | — | 62 | 50 | 38 | 62 |
| Chemical compound (H) | Type | — | — | — | Terpene | Terpene | Terpene | Terpene |
|  | mixed amount | Parts by weight | — | — | 8 | 10 | 12 | 8 |

TABLE 2

|  |  |  |  | Example 1 | Example 2 | Example 3 | Example 4 | Example 5 | Example 6 | Example 7 |
|---|---|---|---|---|---|---|---|---|---|---|
| Raw materials | Carbon fiber (A) | mixed amount | Parts by weight | 20 | 5 | 20 | 20 | 7 | 35 | 20 |
|  |  | [O/C] | — | 0.2 | 0.2 | 0.2 | 0.2 | 0.2 | 0.2 | 0.2 |
|  | Organic fiber (B) | mixed amount | Parts by weight | 10 | 30 | 10 | 10 | 10 | 5 | 5 |
|  |  | Type | Type | PPS | PPS | PPS | PPS | PPS | PPS | PPS |
|  |  | Tensile fracture elongation | % | 30 | 30 | 30 | 30 | 30 | 30 | 30 |
|  | Thermoplastic resin (C) | Type | — | PP | PP | PP | PP | PP | PP | PP |
|  |  | mixed amount | Parts by weight | 70 | 65 | 70 | 70 | 83 | 60 | 75 |
|  | Chemical compound (D) | Type | — | Terpene | Terpene | Terpene | Terpene | Terpene | Terpene | Terpene |
|  |  | mixed amount | Parts by weight | 8 | 8 | 8 | 8 | 4 | 10 | 8 |
| Molded article | Average fiber length | $L_A$ (measured value) | mm | 1.0 | 1.0 | 0.5 | 1.4 | 1.2 | 0.9 | 1.0 |
|  |  | $L_A \times 0.9$ | mm | 0.9 | 0.9 | 0.5 | 1.3 | 1.1 | 0.8 | 0.9 |
|  | Average straight-line distance between two edges of a single fiber $D_A$ |  | mm | 1.0 | 1.0 | 0.5 | 1.4 | 1.1 | 0.8 | 1.0 |
|  | Average fiber length | $L_B$ (measured value) | mm | 3.2 | 2.7 | 3.2 | 3.9 | 3.1 | 3.1 | 3.5 |
|  |  | $L_B \times 0.1$ | mm | 0.3 | 0.3 | 0.3 | 0.4 | 0.3 | 0.3 | 0.4 |
|  |  | $L_B \times 0.9$ | mm | 2.9 | 2.4 | 2.9 | 3.5 | 2.8 | 2.8 | 3.2 |
|  | Average straight-line distance between two edges of a single fiber $D_B$ |  | mm | 0.8 | 0.6 | 0.9 | 0.5 | 0.8 | 0.3 | 2.8 |
| Evaluation results | Dispersibility |  | — | A | A | A | A | A | B | B |
|  | Falling weight impact strength | 23° C. | J | 8.0 | 14.0 | 6.9 | 12.0 | 5.0 | 15.2 | 10.4 |
|  |  | −20° C. | J | 7.8 | 15.2 | 6.3 | 11.5 | 5.0 | 10.4 | 6.2 |
|  | Falling weight impact strength ratio | −20° C./23° C. | — | 0.98 | 1.09 | 0.91 | 0.96 | 1.00 | 0.68 | 0.60 |
|  | Charpy impact strength |  | kJ/m² | 15.0 | 20.0 | 13.1 | 17.0 | 13.0 | 20.0 | 14.0 |
|  | Flexural strength |  | MPa | 229.0 | 130.0 | 140.0 | 240.0 | 150.0 | 290.0 | 245.0 |
|  | The end face of the organic fibers (B) at break | whether the end face has an inclination with respect to a perpendicular plane to the fiber axis |  | YES | YES | YES | YES | YES | NO | NO |

TABLE 3

|  |  |  |  | Example 8 | Example 9 | Example 10 | Example 11 | Example 12 | Example 13 |
|---|---|---|---|---|---|---|---|---|---|
| Raw materials | Carbon fiber (A) | mixed amount | Parts by weight | 20 | 20 | 20 | 20 | 20 | 25 |
|  |  | [O/C] | — | 0.2 | 0.2 | 0.2 | 0.2 | 0.2 | 0.2 |
|  | Organic fiber (B) | mixed amount | Parts by weight | 10 | 10 | 10 | 10 | 10 | 40 |
|  |  | Type | Type | PPS | PPS | PPS | PET | PTFE | PPS |
|  |  | Tensile fracture elongation | % | 30 | 30 | 30 | 15 | 25 | 30 |
|  | Thermoplastic resin (C) | Type | — | PP | PP | PP | PP | PC | PP |
|  |  | mixed amount | Parts by weight | 70 | 70 | 70 | 70 | 70 | 35 |

TABLE 3-continued

|  |  |  |  | Example 8 | Example 9 | Example 10 | Example 11 | Example 12 | Example 13 |
|---|---|---|---|---|---|---|---|---|---|
|  | Chemical compound (D) | Type | — | Terpene | Terpene | Terpene | Terpene | epoxy | Terpene |
|  |  | mixed amount | Parts by weight | 8 | 8 | 8 | 8 | 8 | 0 |
| Molded article | Average fiber length | $L_A$ (measured value) | mm | 0.9 | 0.9 | 1.0 | 1.2 | 1.0 | 0.4 |
|  |  | $L_A \times 0.9$ | mm | 0.8 | 0.8 | 0.9 | 1.1 | 0.9 | 0.4 |
|  | Average straight-line distance between two edges of a single fiber $D_A$ |  | mm | 0.8 | 0.9 | 1.0 | 1.2 | 0.9 | 0.4 |
|  | Average fiber length | $L_B$ (measured value) | mm | 1.7 | 1.9 | 4.0 | 2.4 | 3.0 | 1.5 |
|  |  | $L_B \times 0.1$ | mm | 0.2 | 0.2 | 0.4 | 0.2 | 0.3 | 0.2 |
|  |  | $L_B \times 0.9$ | mm | 1.6 | 1.7 | 3.6 | 2.2 | 2.7 | 1.4 |
|  | Average straight-line distance between two edges of a single fiber $D_B$ |  | mm | 0.3 | 1.7 | 4.0 | 0.3 | 1.0 | 0.2 |
| Evaluation results | Dispersibility |  | — | B | B | B | A | A | C |
|  | Falling weight impact strength | 23° C. | J | 7.6 | 7.1 | 10.2 | 17.0 | 18.0 | 8.0 |
|  |  | −20° C. | J | 5.0 | 4.1 | 7.4 | 15.3 | 11.0 | 6.7 |
|  | Falling weight impact strength ratio | −20° C./23° C. | — | 0.66 | 0.58 | 0.73 | 0.90 | 0.61 | 0.84 |
|  | Charpy impact strength |  | kJ/m$^2$ | 13.0 | 13.0 | 17.0 | 23.0 | 18.0 | 12.0 |
|  | Flexural strength |  | MPa | 225.0 | 220.0 | 227.0 | 193.0 | 240.0 | 193.0 |
|  | The end face of the organic fibers (B) at break | whether the end face has an inclination with respect to a perpendicular plane to the fiber axis |  | NO | NO | NO | YES | YES | YES |

TABLE 4

|  |  |  |  | Example 14 | Example 15 | Example 16 | Example 17 | Example 18 |
|---|---|---|---|---|---|---|---|---|
| Raw materials | Carbon fiber (A) | mixed amount | Parts by weight | 10 | 30 | 20 | 20 | 20 |
|  |  | [O/C] | — | 0.2 | 0.2 | 0.2 | 0.2 | 0.2 |
|  | Organic fiber (B) | mixed amount | Parts by weight | 10 | 10 | 30 | 10 | 10 |
|  |  | Type | Type | PPS | PPS | PPS | PPS | PPS |
|  |  | Tensile fracture | % | 30 | 30 | 30 | 30 | 30 |
|  | Thermoplastic resin (C) | Type | — | PP | PP | PP | PP | PP |
|  |  | mixed amount | Parts by weight | 74 | 50 | 38 | 62 | 62 |
|  | Chemical compound (D) | Type | — | Terpene | Terpene | Terpene | Terpene | Terpene |
|  |  | mixed amount | Parts by weight | 6 | 10 | 12 | 8 | 8 |
| Molded article | Average fiber length | $L_A$ (measured value) | mm | 0.9 | 1.1 | 1.0 | 1.0 | 1.2 |
|  |  | $L_A \times 0.9$ | mm | 0.8 | 1.0 | 0.9 | 0.9 | 1.1 |
|  | Average straight-line distance between two edges of a single fiber $D_A$ |  | mm | 0.8 | 1.0 | 0.9 | 1.0 | 1.1 |
|  | Average fiber length | $L_B$ (measured value) | mm | 2.8 | 2.5 | 1.7 | 3.0 | 3.5 |
|  |  | $L_B \times 0.1$ | mm | 0.3 | 0.3 | 0.2 | 0.3 | 0.4 |
|  |  | $L_B \times 0.9$ | mm | 2.5 | 2.3 | 1.5 | 2.7 | 3.2 |
|  | Average straight-line distance between two edges of a single fiber $D_B$ |  | mm | 1.1 | 0.7 | 0.4 | 2.4 | 0.7 |
| Molding material structure | Fiber distribution |  | — | uneven | uneven | uneven | uneven | uneven |
|  | Fiber bundle (E) state in a cross-section | (A) envelop (B) | — | — | — | — | YES | — |
|  |  | (B) envelop (A) | — | — | — | — | — | YES |
|  |  | at least a portion of (A) and at least a portion of (B) are both in contact | — | YES | YES | YES | — | — |

TABLE 4-continued

|  |  |  | | Example 14 | Example 15 | Example 16 | Example 17 | Example 18 |
|---|---|---|---|---|---|---|---|---|
| Evaluation results | Dispersibility |  | — | A | A | B | B | B |
|  | Falling weight impact strength | 23° C. | J | 7.1 | 13.0 | 9.8 | 7.7 | 7.4 |
|  |  | −20° C. | J | 6.4 | 9.4 | 10.0 | 6.2 | 7.0 |
|  | Falling weight impact strength ratio | −20° C./23° C. | — | 0.9 | 0.7 | 1.0 | 0.8 | 0.9 |
|  | Charpy impact strength |  | kJ/m$^2$ | 13.0 | 18.0 | 18.0 | 13.0 | 14.0 |
|  | Flexural strength |  | MPa | 185.0 | 276.0 | 180.0 | 220.0 | 200.0 |
|  | The end face of the organic fibers (B) at break | whether the end face has an inclination with respect to a perpendicular plane to the fiber axis |  | YES | YES | YES | NO | NO |

TABLE 5

|  |  |  |  | Example 19 | Example 20 | Example 21 | Example 22 | Example 23 | Example 24 |
|---|---|---|---|---|---|---|---|---|---|
|  | Carbon fiber reinforced thermoplastic resin molding material (X-1) | mixed amount | Parts by weight | 67 | 23 | 17 | — | 67 | 67 |
|  | Carbon fiber reinforced thermoplastic resin molding material (X-2) | mixed amount | Parts by weight | — | — | — | 75 | — | — |
|  | Thermoplastic resin (C) | Type | — | — | PP | PP | — | PP | — |
|  |  | mixed amount | Parts by weight | — | 44 | 8 | — | 16 | — |
|  | Organic fiber reinforced thermoplastic resin molding material (Y-1) | mixed amount | Parts by weight | 33 | 33 | — | — | 17 | — |
|  |  | Organic fiber Type | — | PPS | PPS | — | — | PPS | — |
|  |  | Tensile fracture elongation | % | 30 | 30 | — | — | 30 | — |
|  | Organic fiber reinforced thermoplastic resin molding material (Y-2) | mixed amount | Parts by weight | — | — | 75 | 25 | — | — |
|  |  | Organic fiber Type | — | — | — | PPS | PPS | — | — |
|  |  | Tensile fracture elongation | % | — | — | 30 | 30 | — | — |
|  | Organic fiber reinforced thermoplastic resin molding material (Y-3) | mixed amount | Parts by weight | — | — | — | — | — | — |
|  |  | Organic fiber Type | — | — | — | — | — | — | — |
|  |  | Tensile fracture elongation | % | — | — | — | — | — | — |
|  | Organic fiber reinforced thermoplastic resin molding material (Y-4) (produced by melt-kneading) | mixed amount | Parts by weight | — | — | — | — | — | 33 |
|  |  | Organic fiber Type | — | — | — | — | — | — | PPS |
|  |  | Tensile fracture elongation | % | — | — | — | — | — | 30 |
| Molded article | Average fiber length | $L_A$ (measured value) | mm | 1.0 | 1.2 | 1.1 | 1.2 | 1.0 | 1.3 |
|  |  | $L_A \times 0.9$ | mm | 0.9 | 1.1 | 1.0 | 1.1 | 0.9 | 1.2 |
|  | Average straight-line distance between two edges of a single fiber $D_A$ |  | mm | 1.0 | 1.1 | 1.0 | 1.1 | 1.0 | 1.3 |
|  | Average fiber length | $L_B$ (measured value) | mm | 3.2 | 3.1 | 2.6 | 2.9 | 2.0 | 1.5 |
|  |  | $L_B \times 0.1$ | mm | 0.3 | 0.3 | 0.3 | 0.3 | 0.2 | 0.2 |
|  |  | $L_B \times 0.9$ | mm | 2.9 | 2.8 | 2.3 | 2.6 | 1.8 | 1.4 |
|  | Average straight-line distance between two edges of a single fiber $D_B$ |  | mm | 0.8 | 0.8 | 0.5 | 1.0 | 1.2 | 0.3 |

TABLE 5-continued

|  |  |  | Example 19 | Example 20 | Example 21 | Example 22 | Example 23 | Example 24 |
|---|---|---|---|---|---|---|---|---|
| Evaluation results | Productibility | — | B | B | B | B | B | A |
|  | Dispersibility | — | A | A | A | B | A | A |
|  | Falling weight impact strength | 23° C. | J | 8.0 | 5.0 | 14.0 | 13.0 | 8.5 | 7.2 |
|  |  | −20° C. | J | 7.8 | 5.0 | 15.2 | 9.4 | 7.1 | 6.7 |
|  | Falling weight impact strength ratio | −20° C./23° C. | — | 1.0 | 1.0 | 1.1 | 0.7 | 0.8 | 0.9 |
|  | Charpy impact strength | kJ/m$^2$ | 15.0 | 13.0 | 20.0 | 18.0 | 13.6 | 12.8 |
|  | Flexural strength | MPa | 229.0 | 150.0 | 130.0 | 276.0 | 245.0 | 202.0 |
|  | The end face of the organic fibers (B) at break | whether the end face has an inclination with respect to a perpendicular plane to the fiber axis | YES | YES | YES | YES | YES | YES |

TABLE 6

|  |  |  |  | Comparative Example | Comparative Example | Comparative Example | Comparative Example | Comparative Example | Comparative Example | Comparative Example |
|---|---|---|---|---|---|---|---|---|---|---|
| Raw materials | Carbon fiber (A) | mixed amount | Parts by weight | 20 | 3 | 50 | 20 | 20 | 20 | 20 |
|  |  | [O/C] | — | 0.2 | 0.2 | 0.2 | 0.2 | 0.2 | 0.2 | 0.2 |
|  | Organic fiber (B) | mixed amount | Parts by weight | — | 10 | 10 | 50 | 10 | 10 | 10 |
|  |  | Type | Type | — | PPS | PPS | PPS | PPS | PPS | PPS |
|  |  | Tensile fracture elongation | % | — | 30 | 30 | 30 | 30 | 30 | 30 |
|  | Thermoplastic resin (C) | Type | — | PP | PP | PP | PP | PP | PP | PP |
|  |  | mixed amount | Parts by weight | 80 | 87 | 40 | 30 | 70 | 70 | 70 |
|  | Chemical compound (D) | Type | — | Terpene | Terpene | Terpene | Terpene | Terpene | Terpene | Terpene |
|  |  | mixed amount | Parts by weight | 6 | 6 | 14 | 16 | 8 | 8 | 8 |
| Molded article | Average fiber length | $L_A$ (measured value) | mm | 1.0 | 1.0 | 0.7 | 0.1 | 0.2 | 0.7 | 0.7 |
|  |  | $L_A \times 0.9$ | mm | 0.9 | 0.9 | 0.6 | 0.1 | 0.2 | 0.6 | 0.6 |
|  | Average straight-line distance between two edges of a single fiber $D_A$ |  | mm | 1.0 | 1.0 | 0.7 | 0.1 | 0.2 | 0.7 | 0.7 |
|  | Average fiber length | $L_B$ (measured value) | mm | — | 3.0 | 3.0 | 2.8 | 3.0 | 1.0 | 2.0 |
|  |  | $L_B \times 0.1$ | mm | — | 0.3 | 0.3 | 0.3 | 0.3 | 0.1 | 0.2 |
|  |  | $L_B \times 0.9$ | mm | — | 2.7 | 2.7 | 2.5 | 2.7 | 0.9 | 1.8 |
|  | Average straight-line distance between two edges of a single fiber $D_B$ |  | mm | — | 0.8 | 0.8 | 0.8 | 0.8 | 0.5 | 2.0 |
| Evaluation results | Dispersibility |  | — | A | A | C | D | A | B | A |
|  | Falling weight impact strength | 23° C. | J | 5.0 | 2.3 | 16.0 | 6.0 | 6.0 | 5.2 | 7.8 |
|  |  | −20° C. | J | 3.1 | 2.0 | 14.0 | 5.0 | 5.0 | 3.5 | 5.0 |
|  | Falling weight impact strength ratio | −20° C./23° C. | — | 0.62 | 0.87 | 0.88 | 0.83 | 0.83 | 0.67 | 0.64 |
|  | Charpy impact strength |  | kJ/m$^2$ | 9.0 | 5.0 | 8.0 | 10.0 | 7.0 | 9.2 | 9.2 |
|  | Flexural strength |  | MPa | 238.0 | 98.0 | 290.0 | 100.0 | 105.0 | 203.0 | 219.0 |
|  | The end face of the organic fibers (B) at break | whether the end face has an inclination with respect to a perpendicular plane to the fiber axis |  | — | YES | YES | YES | YES | YES | YES |

TABLE 7

|  |  |  |  | Comparative Example 8 | Comparative Example 9 | Comparative Example 10 |
|---|---|---|---|---|---|---|
| Raw materials | Carbon fiber (A) | mixed amount | Parts by weight | 3 | 10 | 20 |
|  |  | [O/C] |  | — | 0.2 | 0.2 | 
|  |  |  |  |  |  |  |
|  | Organic fiber (B) | mixed amount | Parts by weight | 20 | 50 | 10 |
|  |  | Type | Type | PPS | PPS | PPS |
|  |  | Tensile fracture elongation | % | 30 | 30 | 30 |
|  | Thermoplastic resin (C) | Type | — | PP | PP | PP |
|  |  | mixed amount | Parts by weight | 70 | 26 | 62 |
|  | Chemical compound (D) | Type | — | Terpene | Terpene | Terpene |
|  |  | mixed amount | Parts by weight | 7 | 14 | 8 |
| Molded article | Average fiber length | $L_A$ (measured value) | mm | 0.9 | 0.3 | 0.2 |
|  |  | $L_A \times 0.9$ | mm | 0.8 | 0.3 | 0.2 |
|  | Average straight-line distance between two edges of a single fiber $D_A$ |  | mm | 0.9 | 0.3 | 0.2 |
|  | Average fiber length | $L_B$ (measured value) | mm | 2.8 | 2.3 | 1.3 |
|  |  | $L_B \times 0.1$ | mm | 0.3 | 0.2 | 0.1 |
|  |  | $L_B \times 0.9$ | mm | 2.5 | 2.1 | 1.2 |
|  | Average straight-line distance between two edges of a single fiber $D_B$ |  | mm | 0.7 | 0.5 | 1.3 |
| Molding material structure | Fiber distribution |  | — | uneven | uneven | even |
|  | Fiber bundle (E) state in a cross-section | (A) envelop (B) | — | — | — | — |
|  |  | (B) envelop (A) | — | — | — | — |
|  |  | at least a portion of (A) and at least a portion of (B) are both in contact with (C) | — | YES | YES | YES |
| Evaluation results | Dispersibility |  | — | A | D | D |
|  | Falling weight impact strength | 23° C. | J | 2.9 | 6.8 | 6.2 |
|  |  | −20° C. | J | 3.0 | 6.7 | 4.8 |
|  | Falling weight impact strength ratio | −20° C./23° C. | — | 1.0 | 1.0 | 0.8 |
|  | Charpy impact strength |  | kJ/m² | 5.4 | 9.7 | 9.0 |
|  | Flexural strength |  | MPa | 93.0 | 105.0 | 180.0 |
|  | The end face of the organic fibers (B) at break | whether the end face has an inclination with respect to a perpendicular plane to the fiber axis |  | YES | YES | NO |

TABLE 8

|  |  |  | Comparative Example 11 | Comparative Example 12 |
|---|---|---|---|---|
| Carbon fiber reinforced thermoplastic resin molding material (X-1) | mixed amount | Parts by weight | 67 | 10 |
| Carbon fiber reinforced thermoplastic resin molding material (X-2) | mixed amount | Parts by weight | — | — |
| Thermoplastic resin (C) | Type | — | PP | PP |
|  | mixed amount | Parts by weight | 33 | 70 |
| Organic fiber reinforced thermoplastic resin molding material (Y-1) | mixed amount | Parts by weight | — | — |
|  | Organic fiber Type | Type | — | — |
|  | Tensile fracture elongation | % | — | — |
| Organic fiber reinforced thermoplastic resin molding material (Y-2) | mixed amount | Parts by weight | — | — |
|  | Organic fiber Type | Type | — | — |
|  | Tensile fracture elongation | % | — | — |
| Organic fiber reinforced | mixed amount | Parts by weight | — | 20 |

TABLE 8-continued

|  |  |  |  | Comparative Example 11 | Comparative Example 12 |
|---|---|---|---|---|---|
|  | thermoplastic resin molding material (Y-3) | Organic fiber Type | Type | — | PPS |
|  |  | Tensile fracture elongation | % | — | 30 |
|  | Organic fiber reinforced thermoplastic resin molding material (Y-4) (produced by melt-kneading) | mixed amount | Parts by weight | — | — |
|  |  | Organic fiber Type | Type | — | — |
|  |  | Tensile fracture elongation | % | — | — |
| Molded article | Average fiber length | $L_A$ (measured value) | mm | 1.0 | 1.0 |
|  |  | $L_A \times 0.9$ | mm | 0.9 | 0.9 |
|  | Average straight-line distance between two edges of a single fiber $D_A$ |  | mm | 1.0 | 1.0 |
|  | Average fiber length | $L_B$ (measured value) | mm | — | 3.0 |
|  |  | $L_B \times 0.1$ | mm | — | 0.3 |
|  |  | $L_B \times 0.9$ | mm | — | 2.7 |
|  | Average straight-line distance between two edges of a single fiber $D_B$ |  | mm | — | 0.8 |
| Evaluation results | Productibility |  |  | B | B |
|  | Dispersibility |  |  | A | C |
|  | Falling weight impact strength | 23° C. | J | 5.0 | 2.3 |
|  |  | −20° C. | J | 3.1 | 2.0 |
|  | Falling weight impact strength ratio | −20° C./23° C. |  | 0.6 | 0.9 |
|  | Charpy impact strength |  | kJ/m² | 9.0 | 5.0 |
|  | Flexural strength |  | MPa | 238.0 | 98.0 |
|  | The end face of the organic fibers (B) at break | whether the end face has an inclination with respect to a perpendicular plane to the fiber axis |  | — | YES |

INDUSTRIAL APPLICABILITY

The fiber reinforced thermoplastic resin molded article, which has excellent fiber dispersibility and excellent mechanical properties, particularly, impact strength and low-temperature impact strength, is advantageously used for electrical and electronic equipment, office automation equipment, household electrical appliances, housings, automotive parts, and the like.

The invention claimed is:

1. A fiber reinforced thermoplastic resin molding material comprising:
   5 to 45 parts by weight of carbon fibers (A);
   1 to 45 parts by weight of organic fibers (B);
   20 to 93 parts by weight of a thermoplastic resin (C); and
   1 to 20 parts by weight of a compound (D) having a melt viscosity at 200° C. lower than that of the thermoplastic resin (C) based on 100 parts by weight of the total amount of the carbon fibers (A), the organic fibers (B), the thermoplastic resin (C), and the compound (D) having a melt viscosity at 200° C. lower than that of the thermoplastic resin (C),
   wherein the thermoplastic resin (C) is contained at an outer side of a composite (F) obtained by impregnating a fiber bundle (E) comprising the carbon fibers (A) and the organic fibers (B) with the compound (D); the carbon fibers (A) and the organic fibers (B) are unevenly distributed in a cross section of the fiber bundle (E); and the length of the fiber bundle (E) and the length of the fiber reinforced thermoplastic resin molding material are substantially the same.

2. The fiber reinforced thermoplastic resin molding material according to claim 1, wherein the carbon fibers (A) envelop the organic fibers (B) or the organic fibers (B) envelop the carbon fibers (A) in the cross section of the fiber bundle (E).

3. The fiber reinforced thermoplastic resin molding material according to claim 1, wherein at least a portion of the carbon fibers (A) and at least a portion of the organic fibers (B) are both in contact with the thermoplastic resin (C) at the outer side in the cross section of the fiber bundle (E).

4. The fiber reinforced thermoplastic resin molding material according to claim 1, wherein the organic fibers (B) have a tensile break elongation of 10 to 50%.

5. The fiber reinforced thermoplastic resin molding material according to claim 1, wherein the organic fibers (B) are at least one selected from the group consisting of polyamide fibers, polyester fibers, polyarylene sulfide fibers, and fluororesin fibers.

* * * * *